(12) United States Patent
Takahashi et al.

(10) Patent No.: US 9,979,961 B2
(45) Date of Patent: May 22, 2018

(54) IMAGE PROCESSING DEVICE AND IMAGE PROCESSING METHOD

(75) Inventors: Yoshitomo Takahashi, Kanagawa (JP); Shinobu Hattori, Tokyo (JP)

(73) Assignee: Sony Corporation, Tokyo (JP)

( * ) Notice: Subject to any disclaimer, the term of this patent is extended or adjusted under 35 U.S.C. 154(b) by 355 days.

(21) Appl. No.: 14/003,986

(22) PCT Filed: Mar. 9, 2012

(86) PCT No.: PCT/JP2012/056083
§ 371 (c)(1),
(2), (4) Date: Sep. 9, 2013

(87) PCT Pub. No.: WO2012/128069
PCT Pub. Date: Sep. 27, 2012

(65) Prior Publication Data
US 2014/0002592 A1    Jan. 2, 2014

(30) Foreign Application Priority Data

Mar. 18, 2011 (JP) ................................. 2011-061485

(51) Int. Cl.
*H04N 13/00* (2018.01)
*H04N 19/59* (2014.01)
(Continued)

(52) U.S. Cl.
CPC ... *H04N 19/00769* (2013.01); *H04N 13/0048* (2013.01); *H04N 13/0066* (2013.01);
(Continued)

(58) Field of Classification Search
None
See application file for complete search history.

(56) References Cited

U.S. PATENT DOCUMENTS 8,625,918 B2   1/2014 Takahashi et al.
2009/0290811 A1* 11/2009 Imai ...................... G06T 3/4061
                                                        382/285
(Continued)

FOREIGN PATENT DOCUMENTS

JP   2008-263528 A   10/2008
JP   2010-157825 A    7/2010
(Continued)

OTHER PUBLICATIONS

Chen et al., Coding of moving pictures and audio. Response to Call for Evidence on Option-1 Video Coding Technology. ISO/IEC JTC1/SC29/WG11. MPEG2010/M18570. Guangzhou, China, Oct. 2010.
(Continued)

*Primary Examiner* — William C Vaughn, Jr.
*Assistant Examiner* — Lindsay Uhl
(74) *Attorney, Agent, or Firm* — Chip Law Group

(57) ABSTRACT

The invention relates to an image processing device and an image processing method capable of collectively encoding a color image and a depth image of different resolutions. The image processing device comprising an image frame converting unit that converts the resolution of the depth image to the same resolution as that of the color image. An additional information generating unit that generates additional information including information to specify the color image, or information to specify the depth image, image frame conversion information indicating an area of a black image included in the depth image, the resolution of which is converted, and resolution information to distinguish whether the resolutions of the color image and the depth image are different from each other. This technology may be applied to the image processing device of images of multiple viewpoints.

12 Claims, 27 Drawing Sheets

(51) Int. Cl.
*H04N 19/597* (2014.01)
*H04N 13/02* (2006.01)
*H04N 19/70* (2014.01)
*H04N 21/2365* (2011.01)

(52) U.S. Cl.
CPC ......... *H04N 13/0282* (2013.01); *H04N 19/59* (2014.11); *H04N 19/597* (2014.11); *H04N 19/70* (2014.11); *H04N 21/2365* (2013.01); *H04N 2213/005* (2013.01)

(56) References Cited

U.S. PATENT DOCUMENTS

| | | | |
|---|---|---|---|
| 2011/0074924 A1* | 3/2011 | Barenbrug et al. | 348/43 |
| 2011/0149031 A1* | 6/2011 | Um | H04N 13/0011 348/43 |
| 2012/0026157 A1* | 2/2012 | Unkel | G09G 3/003 345/419 |
| 2012/0195492 A1* | 8/2012 | Ali | G06T 3/4007 382/154 |
| 2013/0088570 A1 | 4/2013 | Takahashi et al. | |
| 2013/0342647 A1 | 12/2013 | Takahashi et al. | |
| 2014/0321546 A1 | 10/2014 | Sakurai et al. | |

FOREIGN PATENT DOCUMENTS

| | | |
|---|---|---|
| JP | 2010157825 A * | 7/2010 |
| JP | 2010-267231 A | 11/2010 |
| WO | WO 2010/021666 A1 | 2/2010 |
| WO | WO 2010/071291 A1 | 6/2010 |
| WO | WO 2010/079921 A2 | 7/2010 |
| WO | WO 2010/084437 A2 | 7/2010 |

OTHER PUBLICATIONS

[No Author Listed], Coding of moving pictures and audio. Draft Call for Proposals on 3D Video Coding Technology. ISO/IEC JTC1/SC29/WG11. Doc. N11679, Guangzhou, China, Oct. 2010.

* cited by examiner

FIG. 4

| frame_crop_left_offset | 0 |
|---|---|
| frame_crop_right_offset | 320 |
| frame_crop_top_offset | 0 |
| frame_crop_bottom_offset | 180 |

FIG. 6

```
1:  3dv_view_synthesis_info(payloadSize) {
2:    num_color_views_minus_1
3:    num_depth_views_minus_1
4:    for(i=0; i<num_color_views_minus_1; i++)
5:      color_view_id[i]
6:    for(i=0; i< num_depth_views_minus_1; i++) {
7:      depth_view_id[i]
8:      resolution_differencial_flag[i]
9:      if(resolution_differential_flag[i]) {
10:       frame_crop_left_offset
11:       frame_crop_right_offset
12:       frame_crop_top_offset
13:       frame_crop_bottom_offset
14:     }
15:   }
16: }
17:
18:
19:
20:
```

*FIG. 16*

| | |
|---|---|
| 1: | seq_parameter_set_data() { |
| 2: | ... |
| 3: | seq_parameter_set_id |
| 4: | ... |
| 5: |   frame_cropping_flag |
| 6: |   if(frame_cropping_flag) { |
| 7: |     frame_crop_left_offset |
| 8: |     frame_crop_right_offset |
| 9: |     frame_crop_top_offset |
| 10: |     frame_crop_bottom_offset |
| 11: |   } |
| 12: | ... |
| 13: | } |

*FIG. 17*

| | |
|---|---|
| frame_cropping_flag | 0 |

FIG. 18

```
1:  subset_seq_parameter_set_data() {
2:    seq_parameter_set_data()
3:    ...
4:    seq_parameter_set_mvc_extension()
5:    ...
6:  }
7:  seq_parameter_set_data() {
8:    ...
9:    seq_parameter_set_id
10:   ...
11:     frame_cropping_flag
12:     if(frame_cropping_flag) {
13:       frame_crop_left_offset
14:       frame_crop_right_offset
15:       frame_crop_top_offset
16:       frame_crop_bottom_offset
17:     }
```

FIG. 19

| | |
|---|---|
| frame_cropping_flag | 1 |
| frame_crop_left_offset | 0 |
| frame_crop_right_offset | 320 |
| frame_crop_top_offset | 0 |
| frame_crop_bottom_offset | 180 |

FIG. 20

```
1:  3dv_view_synthesis_info(payloadSize) {
2:    num_color_views_minus_1
3:    num_depth_views_minus_1
4:    for(i=0;i<num_color_views_minus_1;i++)
5:      color_view_id[i]
6:    for(i=0;i<num_depth_views_minus_1;i++) {
7:      depth_view_id[i]
8:    }
9:  }
```

IMAGE PROCESSING DEVICE AND IMAGE PROCESSING METHOD

CROSS REFERENCE TO RELATED APPLICATIONS

The present invention is the National Stage of International Application No. PCT/JP2012/056083, filed in the Japanese Patent Office as a Receiving Office on Mar. 9, 2012, titled "IMAGE PROCESSING DEVICE AND IMAGE PROCESSING METHOD," which claims the priority benefit of Japanese Patent Application Number 2011-061485, filed in the Japanese Patent Office on Mar. 18, 2011, titled "IMAGE PROCESSING DEVICE AND IMAGE PROCESSING METHOD." Each of these applications is hereby incorporated by reference in its entirety.

TECHNICAL FIELD

This technology relates to an image processing device and an image processing method and especially relates to the image processing device and the image processing method capable of collectively encoding or decoding a color image and a depth image of different resolutions.

BACKGROUND ART

Recently, a 3D image attracts attention. The 3D image is generally watched by a method of watching alternately displayed images of two viewpoints with glasses in which a shutter for left eye opens when one of the images of the two viewpoints is displayed and a shutter for right eye opens when the other image is displayed (hereinafter, referred to as a method with glasses).

However, in such method with glasses, a viewer has to purchase the glasses in addition to a 3D image display device, so that buying motivation of the viewer decreases. The viewer should wear the glasses when watching, so that this is troublesome. Therefore, demand for the watching method capable of watching the 3D image without the glasses (hereinafter, referred to as a method without glasses) increases.

In the method without glasses, the images of three or more viewpoints are displayed such that visible angles are different for each viewpoint and the viewer may watch the 3D image without the glasses by watching each image of optional two viewpoints by right and left eyes.

A method of obtaining a color image and a depth image of a predetermined viewpoint and generating color images of multiple viewpoints including the viewpoint other than a predetermined viewpoint using the color image and the depth image to display is studied as the method of displaying the 3D image by the method without glasses. Meanwhile, the term "multiple viewpoints" is intended to mean three or more viewpoints.

A method of separately encoding the color images and the depth images is suggested as a method of encoding the color images and the depth images of the multiple viewpoints (for example, refer to Patent Document 1).

CITATION LIST

Non-Patent Document

Non-Patent Document 1: INTERNATIONAL ORGANISATION FOR STANDARDISATION ORGANISATION INTERNATIONALE DE NORMALISATION ISO/IEC JTC1/SC29/WG11 CODING OF MOVING PICTURES AND AUDIO, Guangzhou, China, October 2010

SUMMARY OF THE INVENTION

Problems to be Solved by the Invention

In a conventional MVC (multiview video coding) standard, it is supposed that the resolutions of the images to be encoded are the same. Therefore, when an encoding device complying with the MVC standard encodes the color image (color) and the depth image (depth) of the same resolution as illustrated in FIG. 1A, the encoding device may collectively encode the color image and the depth image.

However, when the encoding device complying with the MVC standard encodes the color image (color) and the depth image (depth) of different resolutions as illustrated in FIG. 1B, it is not possible to collectively encode the color image and the depth image. Therefore, it is required to provide an encoder, which encodes the color image, and the encoder, which encodes the depth image. Similarly, a decoding device should be provided with a decoder, which decodes the color image, and the decoder, which decodes the depth image.

Therefore, it is desired that the encoding device collectively encodes the color image and the depth image of different resolutions and that the decoding device decodes an encoded result.

This technology is achieved in consideration of such a condition and this makes it possible to collectively encode or decode the color image and the depth image of different resolutions.

Solutions to Problems

An image processing device according to a first aspect of this technology is an image processing device, including: a resolution converting unit, which converts a resolution of a depth image to the same resolution as the resolution of a color image; a generating unit, which generates additional information including information to specify the color image or the depth image, conversion information, which indicates an area of an image included in the depth image, the resolution of which is converted by the resolution converting unit, and resolution information to distinguish whether the resolution of the color image and the resolution of the depth image are different from each other; and a transmitting unit, which transmits the color image, the depth image, and the additional information generated by the generating unit.

An image processing method according to the first aspect of this technology corresponds to the image processing device according to the first aspect of this technology.

In the first aspect of this technology, the resolution of the depth image is converted to the same resolution as that of the color image, the additional information including the information to specify the color image or the depth image, the conversion information, which indicates the area of the image included in the depth image, the resolution of which is converted, and the resolution information to distinguish whether the resolution of the color image and the resolution of the depth image are different from each other is generated, and the color image, the depth image, and the additional image are transmitted.

An image processing device according to a second aspect of this technology is an image processing device, including: a receiving unit, which receives a color image, a depth image, a resolution of which is converted to the same resolution as the resolution of the color image, and additional information including information to specify the color image or the depth image, conversion information, which indicates an area of an image included in the depth image, and resolution information to distinguish whether the resolution of the color image and the resolution of the depth image are different from each other; an extracting unit, which extracts a depth image before resolution conversion from the depth image based on the additional information received by the receiving unit; and a generating unit, which generates a new color image using the color image and the depth image extracted by the extracting unit.

An image processing method according to the second aspect of this technology corresponds to the image processing device according to the second aspect of this technology.

In the second aspect of this technology, the color image, the depth image, the resolution of which is converted to the same resolution as that of the color image, and the additional information including the information to specify the color image or the depth image, the conversion information, which indicates the area of the image included in the depth image, and the resolution information to distinguish whether the resolution of the color image and the resolution of the depth image are different from each other are received, the depth image before the resolution conversion is extracted from the depth image based on the received additional information, and the new color image is generated using the color image and the extracted depth image.

Meanwhile, it is possible to realize the image processing device according to the first and second aspects by allowing a computer to execute a program.

The program executed by the computer for realization of the image processing device according to the first and second aspects may be transmitted through a transmitting medium or recorded on a recording medium to be provided.

Effects of the Invention

According to the first aspect of this technology, the color image and the depth image of different resolutions may be collectively encoded.

According to the second aspect of this technology, the color image and the depth image of different resolutions, which are collectively encoded, may be decoded.

BRIEF DESCRIPTION OF DRAWINGS

FIG. 4 is a view illustrating a configuration example of image frame conversion information.

FIG. 6 is a view illustrating a description example of a part of SEI in FIG. 5.

FIG. 16 is a view illustrating a description example of a part of an SPS in FIG. 15.

FIG. 17 is a view illustrating a description example of a part of the SPS generated by the encoding device in FIG. 14.

FIG. 18 is a view illustrating a description example of a part of a Subset SPS in FIG. 15.

FIG. 19 is a view illustrating a description example of a part of the Subset SPS generated by the encoding device in FIG. 14.

FIG. 20 is a view illustrating a description example of a part of SEI in FIG. 15.

MODE FOR CARRYING OUT THE INVENTION

<Description of Depth Image in This Specification>

Figure 24:
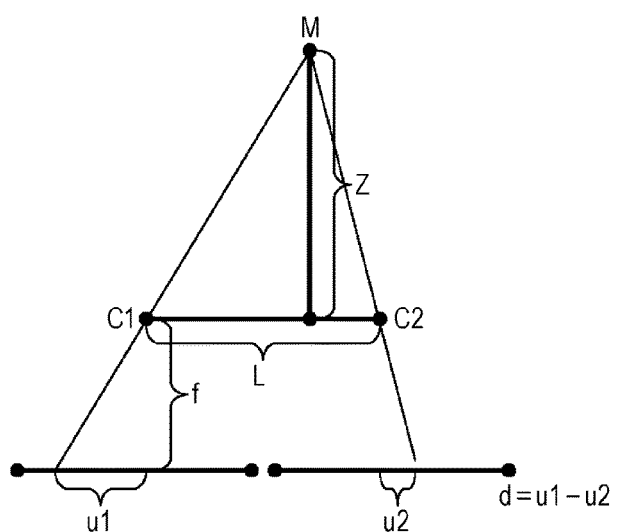
FIG. 24 is a view illustrating a parallax and a depth.

FIG. 24 is a view illustrating a parallax and a depth.

As illustrated in FIG. 24, when a color image of a subject M is taken by a camera c1 arranged in a position C1 and a camera c2 arranged in a position C2, a depth Z, which is a distance from the camera c1 (camera c2) to the subject M in a depth direction is defined by following equation (a).

$$Z=(L/d)\times f \tag{a}$$

Meanwhile, L represents a distance between the position C1 and the position C2 in a horizontal direction (hereinafter, referred to as an inter-camera distance). Also, d represents a value obtained by subtracting a distance u2 between a position of the subject M on the image taken by the camera c2 and the center of the taken image in the horizontal direction from a distance u1 between the position of the subject M on the image taken by the camera c1 and the center of the taken image in the horizontal direction, that is to say, the parallax. Further, f represents a focal distance of the camera c1 and it is supposed that the focal distance of the camera c1 and that of the camera c2 are the same in equation (a).

As represented by equation (a), the parallax d and the depth Z may be uniquely converted. Therefore, in this specification, an image indicating the parallax d of the color images of two viewpoints taken by the cameras c1 and c2 and an image indicating the depth Z are collectively referred to as depth images.

Meanwhile, the image indicating the parallax d or the depth Z may be used as the depth image, and not the parallax d or the depth Z itself but a value obtained by normalizing the parallax d, a value obtained by normalizing an inverse number 1/Z of the depth Z and the like may be adopted as a pixel value of the depth image.

A value I obtained by normalizing the parallax d to 8 bits (0 to 255) may be obtained by following equation (b). Meanwhile, the parallax d is not necessarily normalized to 8 bits and this may also be normalized to 10 bits, 12 bits and the like.

[Equation 3]

$$I = \frac{255 \times (d - D_{min})}{D_{max} - D_{min}} \quad (b)$$

Meanwhile, in equation (b), $D_{max}$ represents a maximum value of the parallax d and $D_{min}$ represents a minimum value of the parallax d. The maximum value $D_{max}$ and the minimum value $D_{min}$ may be set in units of one screen or set in units of a plurality of screens.

A value y obtained by normalizing the inverse number 1/Z of the depth Z to 8 bits (0 to 255) may be obtained by following equation (c). Meanwhile, the inverse number 1/Z of the depth Z is not necessarily normalized to 8 bits, and this may also be normalized to 10 bits, 12 bits and the like.

[Equation 4]

$$y = 255 \times \frac{\frac{1}{Z} - \frac{1}{Z_{far}}}{\frac{1}{Z_{near}} - \frac{1}{Z_{far}}} \quad (c)$$

Meanwhile, in equation (c), $Z_{far}$ represents a maximum value of the depth Z and $Z_{near}$ represents a minimum value of the depth Z. The maximum value $Z_{far}$ and the minimum value $Z_{near}$ may be set in units of one screen or set in units of a plurality of screens.

In this manner, in this specification, the image in which the value I obtained by normalizing the parallax d is the pixel value and the image in which the value y obtained by normalizing the inverse number 1/Z of the depth Z is the pixel value are collectively referred to as the depth images in consideration of the fact that the parallax d and the depth Z may be uniquely converted. Although a color format of the depth image is herein YUV420 or YUV400, another color format may also be used.

Meanwhile, when attention is focused not on the value I or the value y as the pixel value of the depth image but on information itself of the value, the value I or the value y is made depth information. Further, a map on which the value I or the value y is mapped is made a depth map.

<First Embodiment>
[Configuration Example of First Embodiment of Encoding Device]

Figure 1:
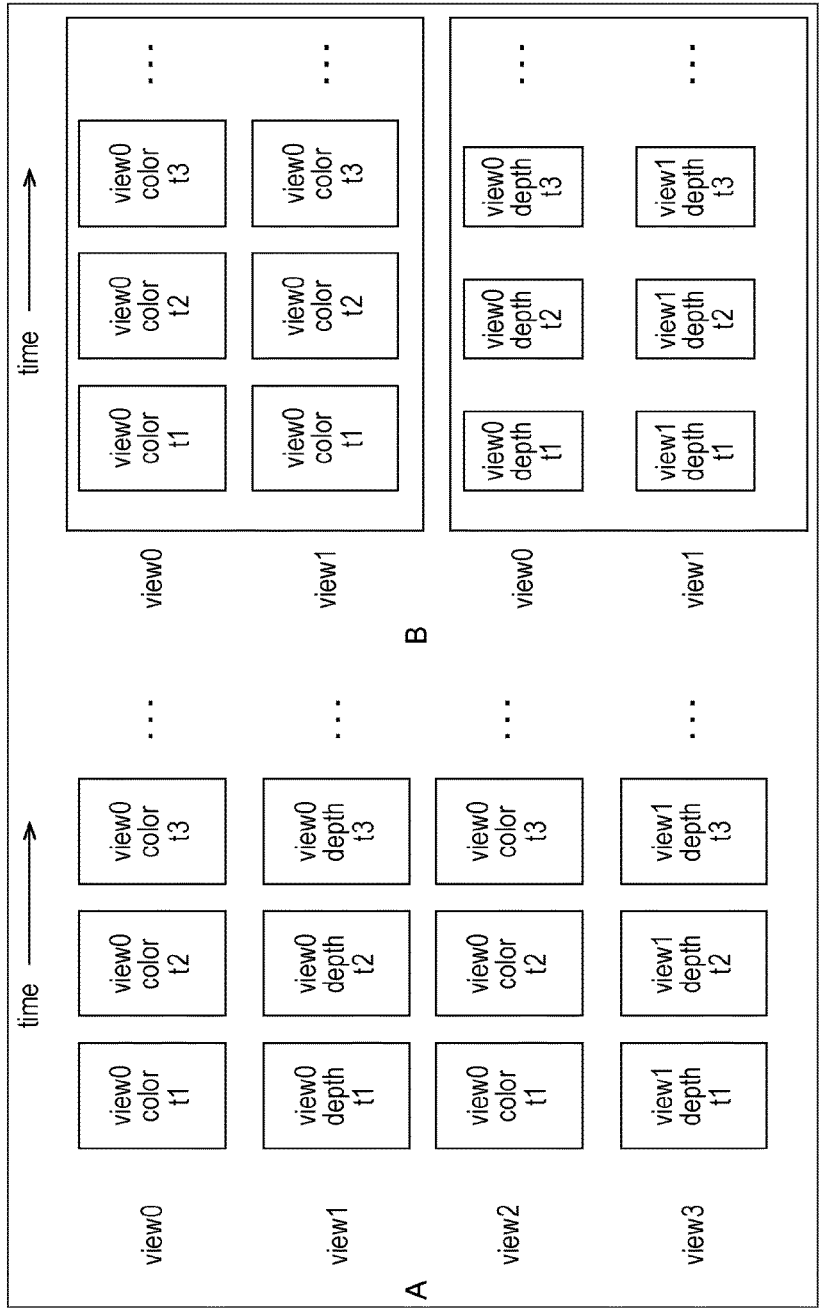
FIG. 1 is a view illustrating encoding in an MVC standard.
Figure 2:
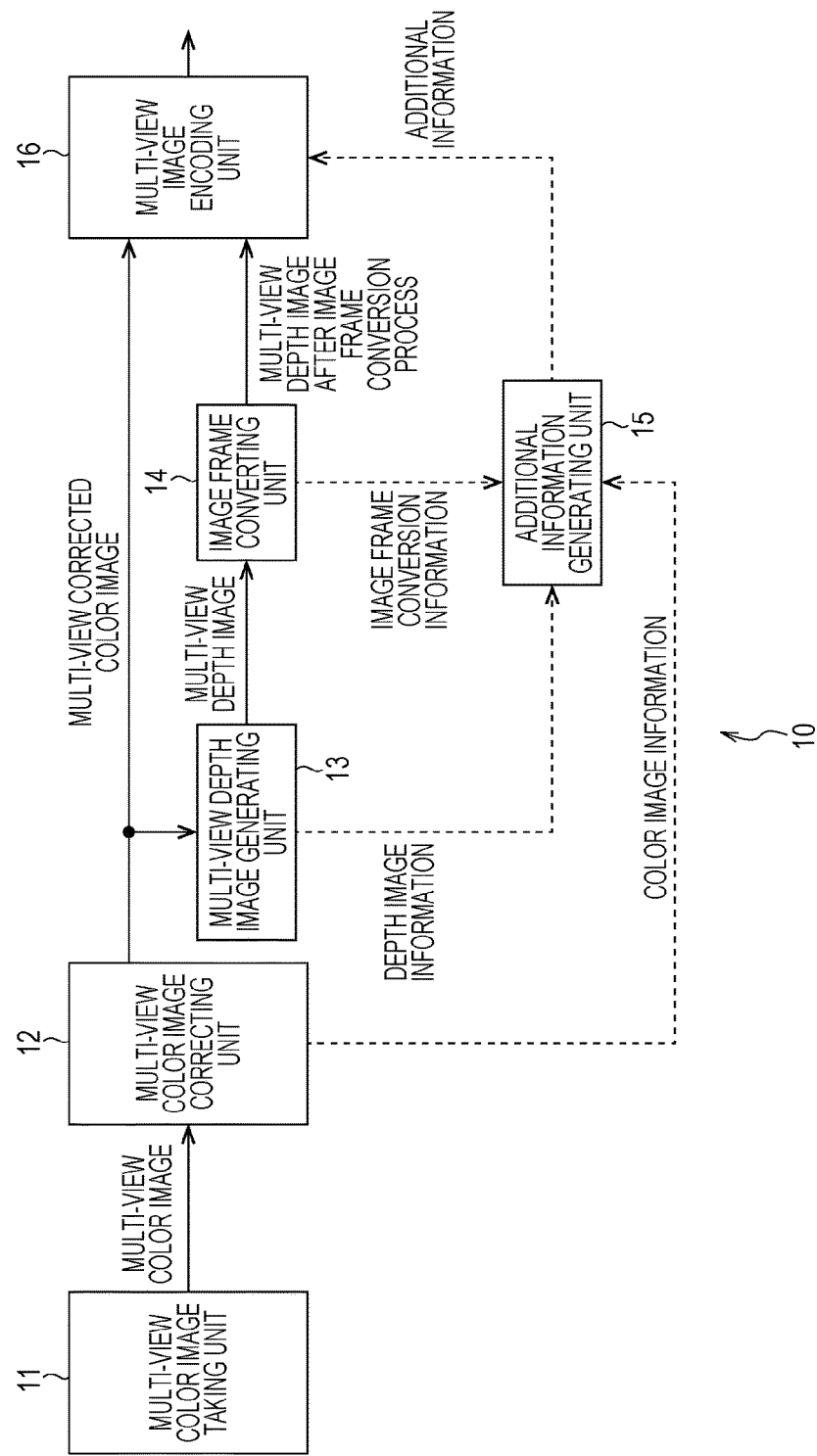
FIG. 2 is a block diagram illustrating a configuration example of a first embodiment of an encoding device as an image processing device to which this technology is applied.

FIG. 2 is a block diagram illustrating a configuration example of a first embodiment of an encoding device as an image processing device to which this technology is applied.

An encoding device 10 in FIG. 2 is composed of a multi-view color image taking unit 11, a multi-view color image correcting unit 12, a multi-view depth image generating unit 13, an image frame converting unit 14, an additional information generating unit 15, and a multi-view image encoding unit 16.

The encoding device 10 collectively encodes color images and depth images of multiple viewpoints and adds predetermined information thereto to transmit.

Specifically, the multi-view color image taking unit 11 of the encoding device 10 takes color images of multiple viewpoints and supplies the same to the multi-view color image correcting unit 12 as the multi-view color image.

The multi-view color image correcting unit 12 performs color correction, luminance correction, distortion correction and the like of the multi-view color image supplied from the multi-view color image taking unit 11. The multi-view color image correcting unit 12 supplies the multi-view color image after the correction to the multi-view depth image generating unit 13 and the multi-view image encoding unit 16 as a multi-view corrected color image. The multi-view color image correcting unit 12 also generates information regarding the multi-view corrected color image such as the number of viewpoints of the multi-view corrected color image and a resolution of each viewpoint as color image information and supplies the same to the additional information generating unit 15.

The multi-view depth image generating unit 13 generates depth images of multiple viewpoints having a predetermined resolution from the multi-view corrected color image supplied from the multi-view color image correcting unit 12. The multi-view depth image generating unit 13 supplies the generated depth images of the multiple viewpoints to the image frame converting unit 14 as the multi-view depth image.

The multi-view depth image generating unit 13 also generates information regarding the multi-view depth image such as the number of viewpoints of the multi-view depth image and the resolution of each viewpoint as depth image information. The multi-view depth image generating unit 13 supplies the depth image information to the additional information generating unit 15.

The image frame converting unit 14, which serves as a resolution converting unit, performs an image frame conversion process to make the resolution high by adding a black image to the multi-view depth image supplied from the multi-view depth image generating unit 13 and makes the resolution of the multi-view depth image the same as the resolution of the multi-view color image. The image frame converting unit 14 supplies the multi-view depth image after the image frame conversion process to the multi-view image encoding unit 16. The image frame converting unit 14 also generates image frame conversion information indicating an area of the black image in the multi-view depth image after the image frame conversion process and supplies the same to the additional information generating unit 15.

The additional information generating unit 15 generates color image specifying information and depth image specifying information based on the color image information supplied from the multi-view color image correcting unit 12 and the depth image information supplied from the multi-view depth image generating unit 13. Meanwhile, the color image specifying information is information to specify the color image and the depth image specifying information is information to specify the depth image.

The additional information generating unit 15 also generates a resolution flag for each viewpoint corresponding to the multi-view depth image based on the resolution of each viewpoint of the multi-view corrected color image included in the color image information and the resolution of each viewpoint of the multi-view depth image included in the depth image information.

Meanwhile, the resolution flag is a flag indicating whether the resolution of the color image and the resolution of the depth image of the corresponding viewpoint are different from each other. The resolution flag is set to 0 when the resolution of the color image and that of the depth image of the corresponding viewpoint are the same and set to 1 when they are different from each other, for example.

The additional information generating unit 15 serves as a generating unit and supplies the number of viewpoints of the multi-view corrected color image, the number of viewpoints of the multi-view depth image, the color image specifying information, the depth image specifying information, the resolution flag, and the image frame conversion information from the image frame converting unit 14 to the multi-view image encoding unit 16 as additional information.

The multi-view image encoding unit 16 serves as an encoding unit and encodes using an MVC scheme using the color image of a predetermined viewpoint of the multi-view corrected color image from the multi-view color image correcting unit 12 as a base view and using the color images of other viewpoints and the multi-view depth image from the image frame converting unit 14 as non-base views. The multi-view image encoding unit 16 adds the additional information and the like to an encoded result to generate a bit stream. The multi-view image encoding unit 16 serves as a transmitting unit and transmits the bit stream as an encoded bit stream.

[Description of Image Frame Conversion Process]

Figure 3:
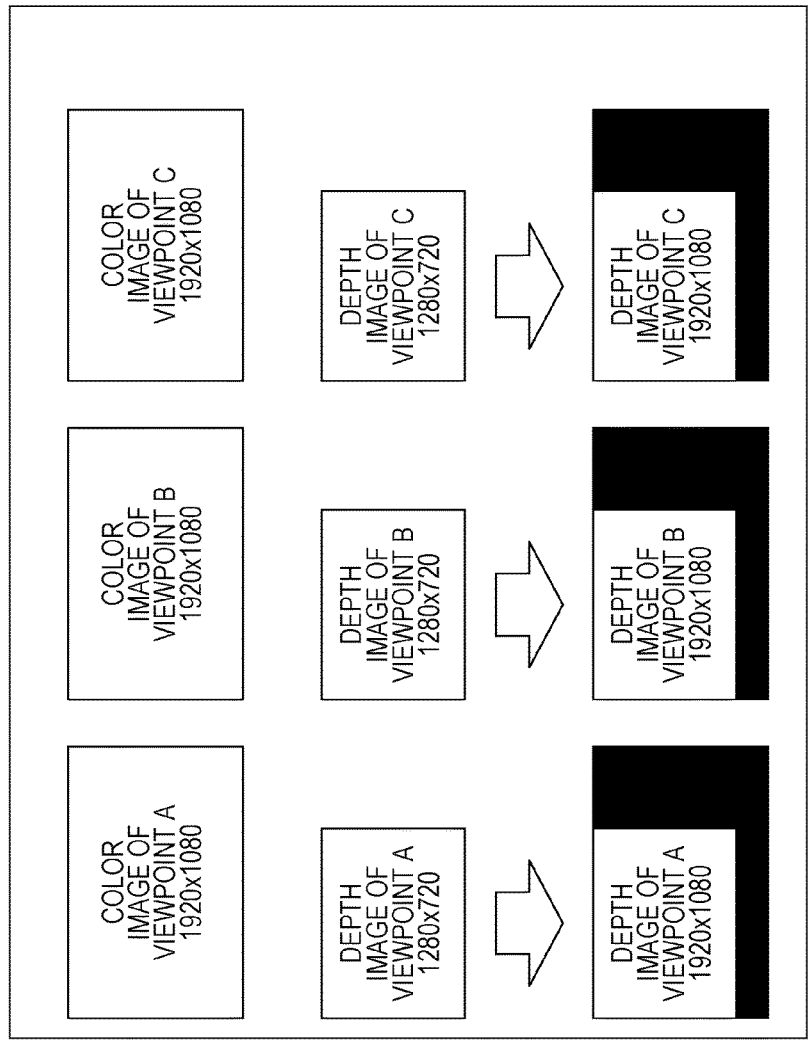
FIG. 3 is a view illustrating an image frame conversion process by an image frame converting unit in FIG. 2.

FIG. 3 is a view illustrating the image frame conversion process by the image frame converting unit 14 in FIG. 2.

In an example in FIG. 3, the multi-view corrected color image is composed of 1920×1080-pixel corrected color images of viewpoints A to C and the multi-view depth image is composed of 1280×720-pixel depth images of the viewpoints A to C.

In this case, as illustrated in FIG. 3, for example, the image frame converting unit 14 performs a process to add the black image on a right side and a bottom side of the depth images of the viewpoints A to C to generate 1920×1080-pixel depth images of the viewpoints A to C as the image frame conversion process.

[Configuration Example of Image Frame Conversion Information]

FIG. 4 is a view illustrating a configuration example of the image frame conversion information.

As illustrated in FIG. 4, the image frame conversion information is composed of left offset information (frame_crop_left_offset), right offset information (frame_crop_right_offset), top offset information (frame_crop_top_offset), and bottom offset information (frame_crop_bottom_offset).

The left offset information is set to half the number of pixels from a left side of the multi-view depth image after the image frame conversion process to a left side of an area, which is not the area of the added black image. The right offset information is set to half the number of pixels from a right side of the multi-view depth image after the image frame conversion process to a right side of the area, which is not the area of the added black image. The top offset information is set to half the number of pixels from a top side of the multi-view depth image after the image frame conversion process to a top side of the area, which is not the area of the added black image. The bottom offset information is set to half the number of pixels from a bottom side of the multi-view depth image after the image frame conversion process to a bottom side of the area, which is not the area of the added black image.

Therefore, when the image frame converting unit 14 performs the image frame conversion process illustrated in FIG. 3, the left offset information, the right offset information, the top offset information, and the bottom offset information are set to 0, 320, 0, and 180, respectively, as illustrated in FIG. 4.

[Configuration Example of Encoded Bit Stream]

Figure 5:
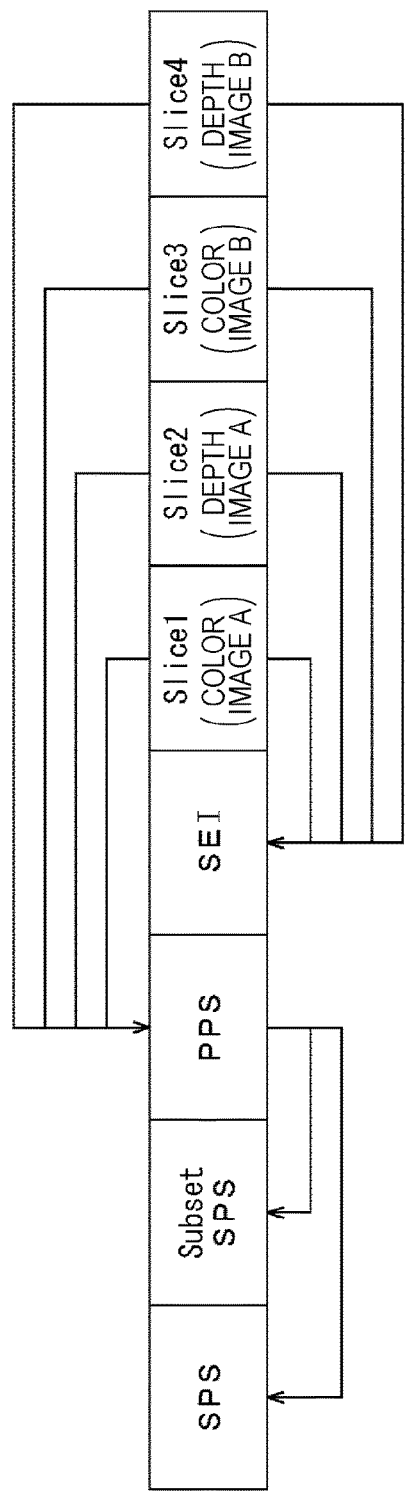
FIG. 5 is a view illustrating a configuration example of an access unit of an encoded bit stream.

FIG. 5 is a view illustrating a configuration example of an access unit of the encoded bit stream generated by the encoding device 10 in FIG. 2.

As illustrated in FIG. 5, the access unit of the encoded bit stream is composed of an SPS (sequence parameter set), a Subset SPS, a PPS (picture parameter set), SEI (supplemental enhancement information), and a slice.

Meanwhile, in an example in FIG. 5, the number of viewpoints of the multi-view corrected color image and the multi-view depth image is two. A corrected color image A of one viewpoint out of the multi-view corrected color image of the two viewpoints is encoded as the base view. Also, a corrected color image B of the other viewpoint, a depth image A after the image frame conversion process corresponding to the color image A, and a depth image B after the image frame conversion process corresponding to the color image B are encoded as the non-base views.

As a result, the slice of the color image A encoded as the base view and the slice of the depth image A, the slice of the color image B, and the slice of the depth image B encoded as the non-base views are arranged in this order from a head, for example. Meanwhile, information for specifying the PPS is described in a header part of each slice.

The SPS is a header including information regarding the encoding of the base view. The subset SPS is an extended header including information regarding the encoding of the base view and the non-base view. The PPS is a header including information indicating an encoding mode of an entire picture, information for specifying the SPS and the Subset SPS and the like. The SEI is supplemental information of the encoded bit stream and includes additive information not essential for decoding such as the additional information generated by the additional information generating unit 15.

When the color image A encoded as the base view is decoded, the PPS is referred to based on the information for specifying the PPS described in the header part of the color image A and the SPS is referred to based on the information for specifying the SPS described in the PPS.

On the other hand, when the depth image A encoded as the non-base view is decoded, the PPS is referred to based on the information for specifying the PPS described in the header of the depth image A. Also, the Subset SPS is referred to based on the information for specifying the Sub SPSset described in the PPS. When the color image B and the depth image B encoded as the non-base views are decoded also, the PPS is referred to and the Subset SPS is referred to as in the case in which the depth image A is decoded.

[Description Example of Part of SEI]

FIG. 6 is a view illustrating a description example of a part of the SEI in FIG. 5.

The number of viewpoints of the color image (num_color_views_minus_1) is described in a second row from the top of the SEI in FIG. 6 and the number of viewpoints of the depth image (num_depth_views_minus_1) is described in a third row thereof.

A view ID of the color image (color_view_id) is described in a fifth row from the top in FIG. 6 as the color image specifying information of the color image of each viewpoint and a view ID of the depth image (depth_view_id) is described in a seventh row as the depth image specifying information of the depth image of each viewpoint. A resolution flag (resolution_differencial_flag) is described in an eighth row from the top in FIG. 6 for each viewpoint corresponding to the multi-view depth image. Further, the image frame conversion information is described in each of 10th to 13th rows from the top in FIG. 6 when the resolution flag indicates that the resolutions are different.

[Description of Process of Encoding Device]

Figure 7:
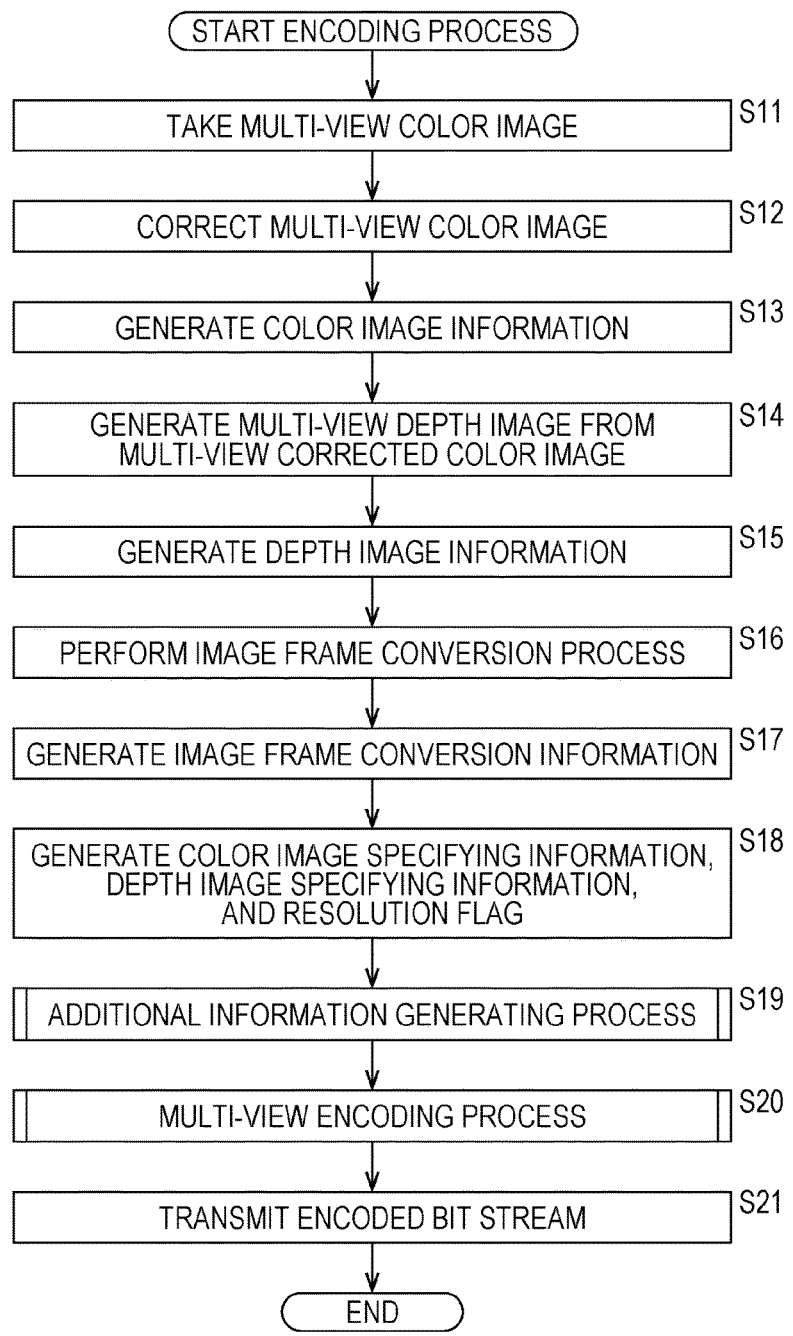
FIG. 7 is a flowchart illustrating an encoding process of the encoding device in FIG. 2.

FIG. 7 is a flowchart illustrating an encoding process of the encoding device 10 in FIG. 2.

At step S11 in FIG. 7, the multi-view color image taking unit 11 of the encoding device 10 takes color images of the multiple viewpoints and supplies the same to the multi-view color image correcting unit 12 as the multi-view color image.

At step S12, the multi-view color image correcting unit 12 performs the color correction, the luminance correction, the distortion correction and the like of the multi-view color image supplied from the multi-view color image taking unit 11. The multi-view color image correcting unit 12 supplies the multi-view color image after the correction to the multi-view depth image generating unit 13 and the multi-view image encoding unit 16 as the multi-view corrected color image.

At step S13, the multi-view color image correcting unit 12 generates the color image information and supplies the same to the additional information generating unit 15.

At step S14, the multi-view depth image generating unit 13 generates the depth images of the multiple viewpoints having a predetermined resolution from the multi-view corrected color image supplied from the multi-view color image correcting unit 12. The multi-view depth image generating unit 13 supplies the generated depth images of the multiple viewpoints to the image frame converting unit 14 as the multi-view depth image.

At step S15, the multi-view depth image generating unit 13 generates the depth image information and supplies the same to the additional information generating unit 15.

At step S16, the image frame converting unit 14 performs the image frame conversion process of the multi-view depth image supplied from the multi-view depth image generating unit 13 and supplies the multi-view depth image after the image frame conversion process to the multi-view image encoding unit 16.

At step S17, the image frame converting unit 14 generates the image frame conversion information and supplies the same to the additional information generating unit 15.

At step S18, the additional information generating unit 15 generates the color image specifying information, the depth image specifying information, and the resolution flag based on the color image information from the multi-view color image correcting unit 12 and the depth image information from the multi-view depth image generating unit 13.

At step S19, the additional information generating unit 15 performs an additional information generating process to generate the additional information. The additional information generating process is described in detail with reference to FIG. 8 to be illustrated later.

At step S20, the multi-view image encoding unit 16 performs a multi-view encoding process to collectively encode the multi-view corrected color image and the multi-view depth image after the image frame conversion process and add the additional information and the like. The multi-view encoding process is described in detail with reference to FIG. 9 to be illustrated later.

At step S21, the multi-view image encoding unit 16 transmits the encoded bit stream generated as a result of step S20 to finish the process.

Figure 8:
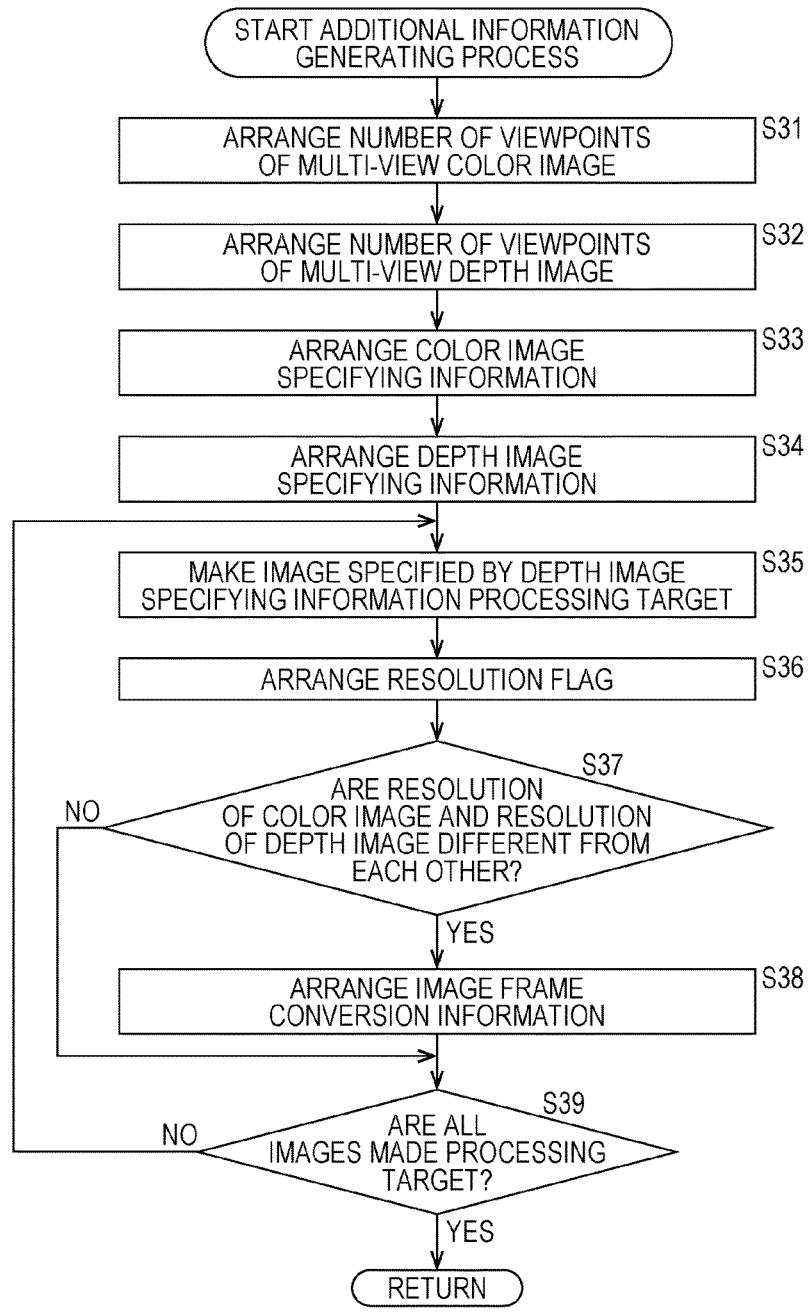
FIG. 8 is a flowchart illustrating an additional information generating process in FIG. 7 in detail.

FIG. 8 is a flowchart illustrating the additional information generating process at step S19 in FIG. 7 in detail.

At step S31 in FIG. 8, the additional information generating unit 15 arranges the number of viewpoints of the multi-view color image included in the color image information supplied from the multi-view color image correcting unit 12 in the additional information.

At step S32, the additional information generating unit 15 arranges the number of viewpoints of the multi-view depth image included in the depth image information supplied from the multi-view depth image generating unit 13 in the additional information.

At step S33, the additional information generating unit 15 arranges the color image specifying information generated at step S18 in FIG. 7 in the additional information.

At step S34, the additional information generating unit 15 arranges the depth image specifying information generated at step S19 in FIG. 7 in the additional information.

At step S35, the additional information generating unit 15 makes the image, which is not yet made a processing target out of the images specified by the depth image specifying information, the processing target.

At step S36, the additional information generating unit 15 arranges the resolution flag of the viewpoint corresponding to the image, which is the processing target, generated at step S18 in FIG. 7 in the additional information.

At step S37, the additional information generating unit 15 determines whether the resolution of the color image and that of the depth image of the viewpoint differ from each other based on the resolution flag of the viewpoint corresponding to the image, which is the processing target. When it is determined that the resolutions of the color image and that of the depth image are different from each other at step S37, the process shifts to step S38.

At step S38, the additional information generating unit 15 arranges the image frame conversion information supplied from the image frame converting unit 14 in the additional information and the procedure shifts to step S39.

On the other hand, when it is determined that the resolution of the color image and that of the depth image are same at step S37, the process shifts to step S39.

At step S39, the additional information generating unit 15 determines whether all the images specified by the depth image specifying information are made the processing target. When it is determined that not all the images are made the processing target yet at step S39, the process returns to step S35 and subsequent processes are repeated until all the images are made the processing target.

On the other hand, when it is determined that all the images are made the processing target at step S39, the additional information generating unit 15 supplies the additional information to the multi-view image encoding unit 16. Then, the process returns to step S19 in FIG. 7 to shift to step S20.

Figure 9:
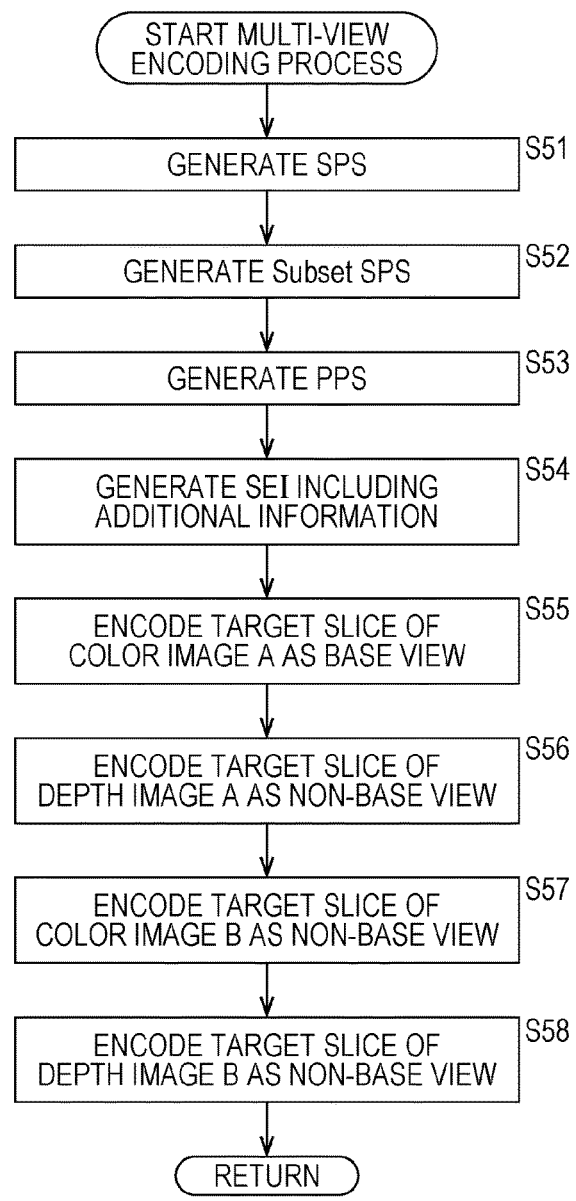
FIG. 9 is a flowchart illustrating a multi-view encoding process in FIG. 7 in detail.

FIG. 9 is a flowchart illustrating the multi-view encoding process at step S20 in FIG. 7 in detail. The multi-view encoding process is performed for each slice, for example. Also, in the multi-view encoding process in FIG. 9, it is supposed that the images to be encoded are the color image A, the color image B, the depth image A, and the depth image B.

At step S51 in FIG. 9, the multi-view image encoding unit 16 generates the SPS of a target slice, which is the slice to be processed, and assigns an inherent ID to the SPS. At step S52, the multi-view image encoding unit 16 generates the Subset SPS of the target slice and assigns an inherent ID to the Subset SPS.

At step S53, the multi-view image encoding unit 16 generates the PPS of the target slice including the IDs assigned at steps S51 and S52 and assigns an inherent ID to the PPS. At step S54, the multi-view image encoding unit 16 generates the SEI including the additional information of the target slice.

At step S55, the multi-view image encoding unit 16 encodes the target slice of the color image A as the base view and adds the header part including the ID assigned at step S53. At step S56, the multi-view image encoding unit 16 encodes the target slice of the depth image A as the non-base view and adds the header part including the ID assigned at step S53.

At step S57, the multi-view image encoding unit 16 encodes the target slice of the color image B as the non-base view and adds the header part including the ID assigned at step S53. At step S58, the multi-view image encoding unit 16 encodes the target slice of the depth image B as the non-base view and adds the header part including the ID assigned at step S53.

Then, the multi-view image encoding unit 16 arranges the SPS, the Subset SPS, the PPS, and the SEI, which are generated, and the target slice of the color image A, the target slice of the depth image A, the target slice of the color image B, and the target slice of the depth image B, which are encoded, in this order to generate the encoded bit stream. Then, the process returns to step S20 in FIG. 7 to shift to step S21.

Meanwhile, although the SPS is generated for each slice in the multi-view encoding process in FIG. 9 for convenience of description, when the SPS of a current target slice is the same as the SPS of a previous target slice, the SPS is not generated. The same applies to the Subset SPS, the PPS, and the SEI.

As described above, the encoding device 10 performs the image frame conversion process of the multi-view depth image, so that it is possible to collectively encode the multi-view color image and the multi-view depth image even when the resolution of the multi-view color image and that of the multi-view depth image are different from each other.

On the other hand, by a method of making the resolution of the multi-view depth image as high as the resolution of the multi-view color image by interpolation and collectively encoding them, an interpolated image is included in the multi-view depth image to be encoded, so that a data amount becomes larger than that in the case of the encoding device 10. Also, encoding efficiency is deteriorated.

The encoding device 10 also transmits the additional information, so that it is possible to distinguish the multi-view color image from the multi-view depth image and extract (crop) the multi-view depth image, the resolution of which is lower than that of the multi-view color image, by a decoding device to be described later.

[Configuration Example of First Embodiment of Decoding Device]

Figure 10:
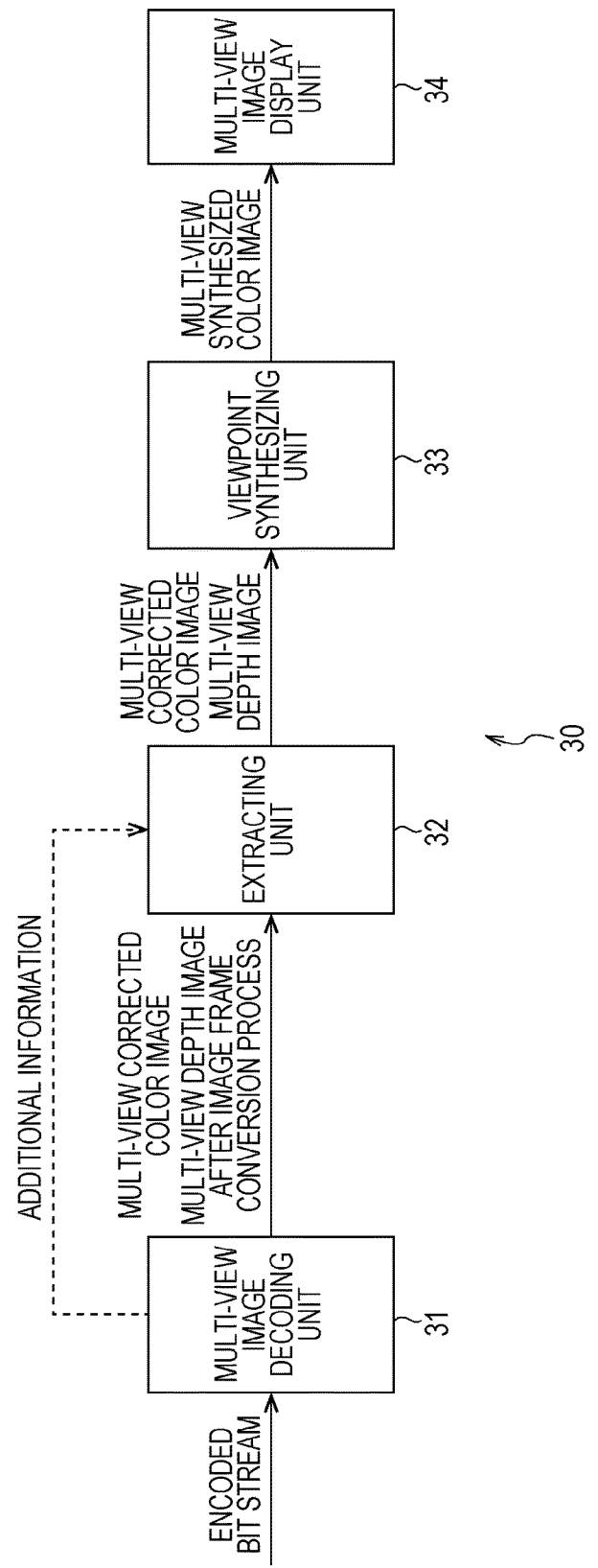
FIG. 10 is a block diagram illustrating a configuration example of a first embodiment of a decoding device as the image processing device to which this technology is applied.

FIG. 10 is a block diagram illustrating a configuration example of a first embodiment of a decoding device as the image processing device to which this technology is applied, which decodes the encoded bit stream transmitted from the encoding device 10 in FIG. 2.

A decoding device 30 in FIG. 10 is composed of a multi-view image decoding unit 31, an extracting unit 32, a viewpoint synthesizing unit 33, and a multi-view image display unit 34.

The multi-view image decoding unit 31 of the decoding device 30 serves as a receiving unit and receives the encoded bit stream transmitted from the encoding device 10 in FIG. 2. The multi-view image decoding unit 31 extracts the additional information from the SEI of the received encoded bit stream and supplies the same to the extracting unit 32. The multi-view image decoding unit 31, which also serves as a decoding unit, decodes the encoded bit stream using a scheme corresponding to the MVC scheme and generates the multi-view corrected color image and the multi-view depth image after the image frame conversion process to supply to the extracting unit 32.

The extracting unit 32 specifies the multi-view corrected color image having the same number of viewpoints as that of the multi-view color image out of the multi-view corrected color image and the multi-view depth image after the image frame conversion process supplied from the multi-view image decoding unit 31 based on the color image specifying information included in the additional information from the multi-view image decoding unit 31. Then, the extracting unit 32 supplies the multi-view corrected color image to the viewpoint synthesizing unit 33.

The extracting unit 32 specifies the multi-view depth image after the image frame conversion process having the same number of viewpoints as that of the multi-view depth image out of the multi-view corrected color image and the multi-view depth image after the image frame conversion process supplied from the multi-view image decoding unit 31 based on the depth image specifying information included in the additional information. The extracting unit 32 directly makes the depth image corresponding to the resolution flag indicating that the resolutions are the same the depth image before the image frame conversion process based on the resolution flag included in the additional information. The extracting unit 32 also extracts the depth image before the image frame conversion process from the depth image corresponding to the resolution flag indicating that the resolutions are different based on the resolution flag and the image frame conversion process included in the additional information. Then, the extracting unit 32 supplies the multi-view depth image composed of the depth images before the image frame conversion process to the viewpoint synthesizing unit 33.

The viewpoint synthesizing unit 33 performs a warping process to the viewpoints, the number of which corresponds to the multi-view image display unit 34, (hereinafter, referred to as display viewpoints) of the multi-view depth image from the extracting unit 32.

Meanwhile the term "warping process" is intended to mean a process to make geometric transform from the image of a certain viewpoint to the image of another viewpoint.

The display viewpoint includes the viewpoint other than the viewpoint corresponding to the multi-view color image.

Also, the viewpoint synthesizing unit 33 performs the warping process to the display viewpoint of the multi-view corrected color image supplied from the extracting unit 32 using the depth image of the display viewpoint obtained as a result of the warping process. The viewpoint synthesizing unit 33 supplies the color image of the display viewpoint obtained as a result to the multi-view image display unit 34 as a multi-view synthesized color image.

The multi-view image display unit 34 displays the multi-view synthesized color image supplied from the viewpoint synthesizing unit 33 such that a viewable angle is different for each viewpoint. A viewer may watch a 3D image from a plurality of viewpoints without wearing glasses by watching each image of optional two viewpoints with right and left eyes.

[Description of Process of Decoding Device]

Figure 11:
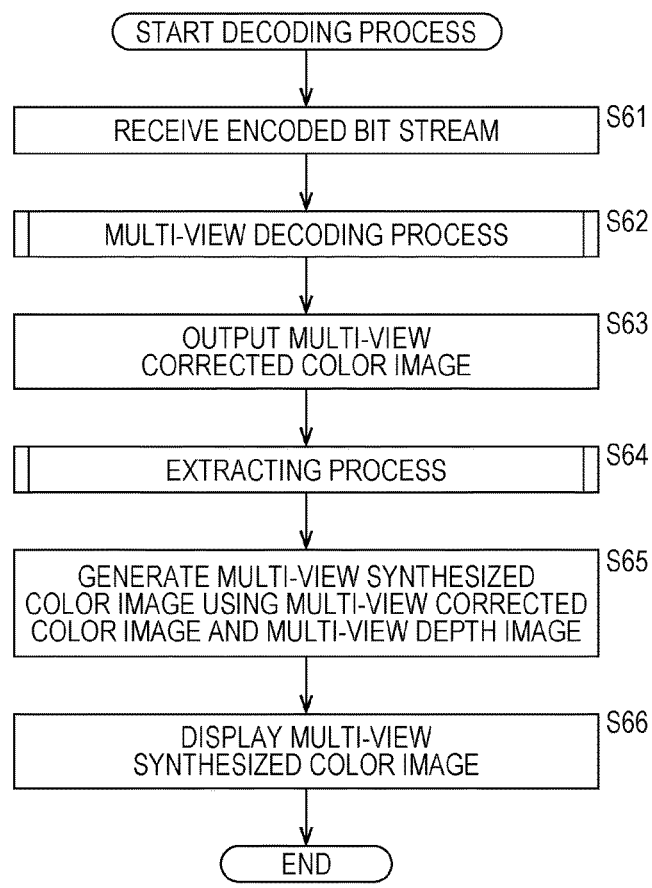
FIG. 11 is a flowchart illustrating a decoding process of the decoding device in FIG. 10.

FIG. 11 is a flowchart illustrating a decoding process of the decoding device 30 in FIG. 10. The decoding process starts when the encoded bit stream is transmitted from the encoding device 10 in FIG. 2, for example.

At step S61 in FIG. 11, the multi-view image decoding unit 31 of the decoding device 30 receives the encoded bit stream transmitted from the encoding device 10 in FIG. 2.

At step S62, the multi-view image decoding unit 31 performs a multi-view decoding process to decode the received encoded bit stream and extract the additional information. The multi-view decoding process is described in detail with reference to FIG. 12 to be illustrated later.

At step S63, the extracting unit 32 outputs the multi-view corrected color image supplied from the multi-view image decoding unit 31 to the viewpoint synthesizing unit 33 based on the color image specifying information included in the additional information supplied from the multi-view image decoding unit 31 by the process at step S62. Specifically, the extracting unit 32 specifies the multi-view corrected color image having the same number of viewpoints as that of the multi-view color image out of the multi-view corrected color image and the multi-view depth image after the image frame conversion process supplied from the multi-view image decoding unit 31 based on the color image specifying information. Then, the extracting unit 32 supplies the multi-view corrected color image to the viewpoint synthesizing unit 33.

At step S64, the extracting unit 32 performs an extracting process to extract the multi-view depth image before the image frame conversion process from the multi-view depth image after the image frame conversion process supplied from the multi-view image decoding unit 31 by the process at step S62. The extracting process is described in detail with reference to FIG. 13 to be illustrated later.

At step S65, the viewpoint synthesizing unit 33, which serves as the generating unit, generates the multi-view synthesized color image using the multi-view corrected color image and the multi-view depth image supplied from the extracting unit 32 and supplies the same to the multi-view image display unit 34.

At step S66, the multi-view image display unit 34 displays the multi-view synthesized color image supplied from the viewpoint synthesizing unit 33 such that the viewable angle is different for each viewpoint to finish the process.

Figure 12:
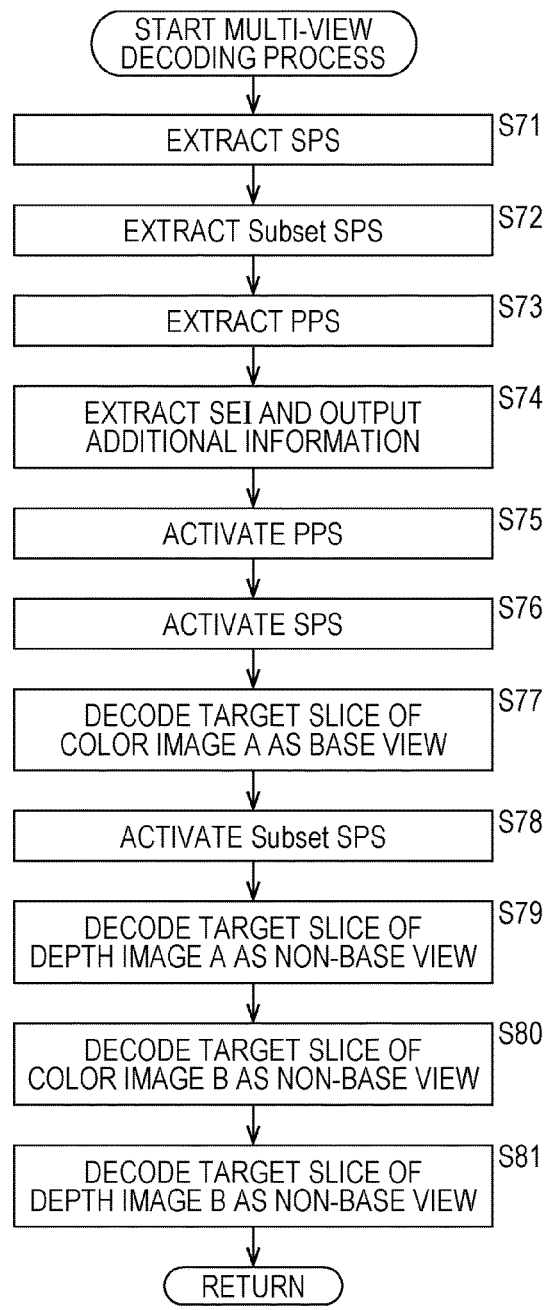
FIG. 12 is a flowchart illustrating a multi-view decoding process in FIG. 11 in detail.

FIG. 12 is a flowchart illustrating the multi-view decoding process at step S62 in FIG. 11 in detail. The multi-view decoding process is performed for each slice, for example.

In the multi-view decoding process in FIG. 12, it is supposed that the images to be decoded are the color image A, the color image B, the depth image A, and the depth image B.

At step S71 in FIG. 12, the multi-view image decoding unit 31 extracts the SPS from the received encoded bit stream. At step S72, the multi-view image decoding unit 31 extracts the Subset SPS from the encoded bit stream. At step S73, the multi-view image decoding unit 31 extracts the PPS from the encoded bit stream.

At step S74, the multi-view image decoding unit 31 extracts the SEI from the encoded bit stream and outputs the additional information included in the SEI to the extracting unit 32.

At step S75, based on the ID of the PPS included in the header of the target slice of the color image A, the multi-view image decoding unit 31 activates the PPS to which the ID is assigned. At step S76, based on the ID of the SPS included in the PPS activated at step S75, the multi-view image decoding unit 31 activates the SPS to which the ID is assigned.

At step S77, the multi-view image decoding unit 31 decodes the target slice of the color image A as the base view with reference to the activated PPS and SPS and supplies the same to the extracting unit 32.

At step S78, based on the ID of the Subset SPS included in the activated PPS, the multi-view image decoding unit 31 activates the Subset SPS to which the ID is assigned. At step S79, the multi-view image decoding unit 31 decodes the target slice of the depth image A as the non-base view with reference to the activated PPS and Subset SPS and supplies the same to the extracting unit 32.

At step S80, the multi-view image decoding unit 31 decodes the target slice of the color image B as the non-base view with reference to the activated PPS and Subset SPS and supplies the same to the extracting unit 32. At step S81, the multi-view image decoding unit 31 decodes the target slice of the depth image B as the non-base view with reference to the activated PPS and Subset SPS and supplies the same to the extracting unit 32. Then, the process returns to step S62 in FIG. 11 to shift to step S63.

Meanwhile, although it is supposed that the SPS, the Subset SPS, the PPS, and the SEI are generated for all the slices and always extracted for each slice for convenience of description in the multi-view decoding process in FIG. 12, when there is the slice, the SPS, the Subset SPS, the PPS, the SEI of which are not generated, a process to extract the SPS, the Subset SPS, the PPS, and the SEI is skipped.

Figure 13:
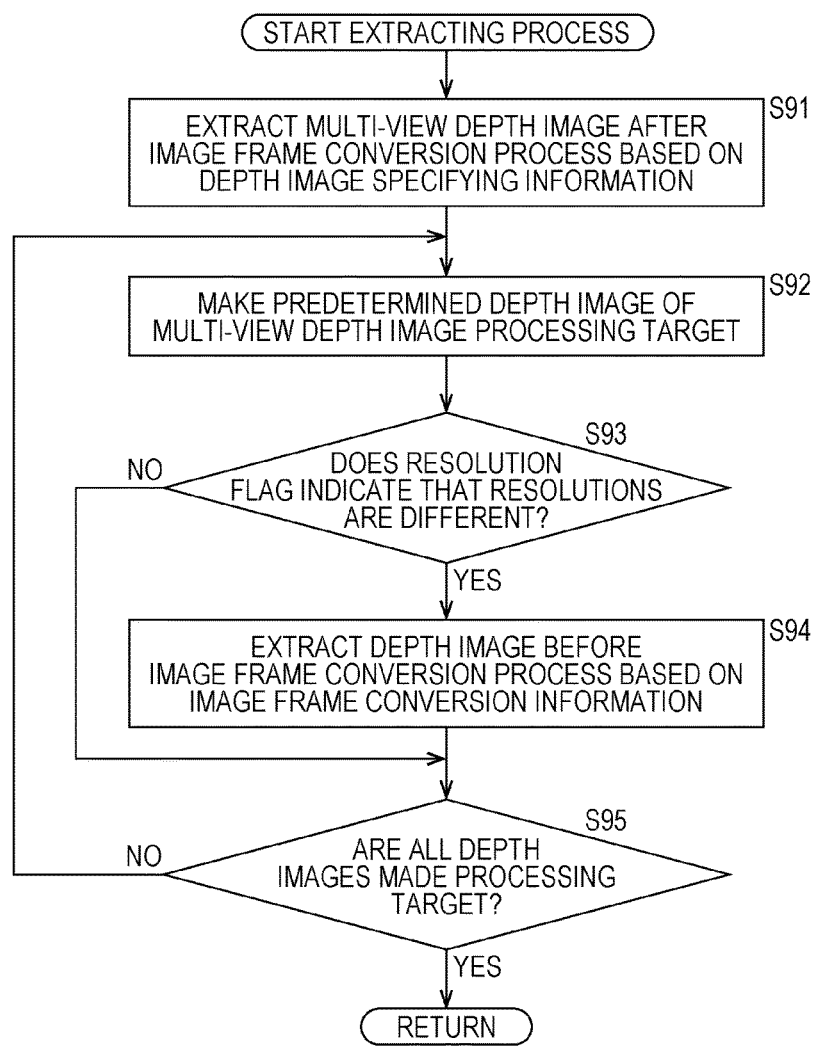
FIG. 13 is a flowchart illustrating an extracting process in FIG. 11 in detail.

FIG. 13 is a flowchart illustrating the extracting process at step S64 in FIG. 11 in detail.

At step S91 in FIG. 13, the extracting unit 32 extracts the multi-view depth image after the image frame conversion process supplied from the multi-view image decoding unit 31 based on the depth image specifying information included in the additional information. Specifically, the extracting unit 32 specifies the multi-view depth image after the image frame conversion process having the same number of viewpoints as that of the multi-view depth image out of the multi-view corrected color image and the multi-view depth image after the image frame conversion process supplied from the multi-view image decoding unit 31 based on the depth image specifying information.

At step S92, the extracting unit 32 makes a predetermined depth image, which is not yet made the processing target out of the multi-view depth image after the image frame conversion process, the processing target.

At step S93, the extracting unit 32 determines whether the resolution flag corresponding to the depth image, which is the processing target, included in the additional information indicates that the resolutions are different.

When it is determined that the resolution flag indicates that the resolutions are different at step S93, at step S94, the extracting unit 32 extracts the depth image before the image frame conversion process from the depth image, which is the processing target, based on the image frame conversion information included in the additional information. For example, when the image frame conversion information of the processing target is the image frame conversion information illustrated in FIG. 4, a 640(=320×2)×1080-pixel area on the left side and a 1280(=1920−640)×360(=180×2)-pixel area on the bottom side of the depth image, which is the processing target, are deleted. Then, the process shifts to step S95.

On the other hand, when it is determined that the resolution flag does not indicate that the resolutions are different at step S93, the extracting unit 32 directly makes the depth image, which is the processing target, the depth image before the image frame conversion process and the process shifts to step S95.

At step S95, the extracting unit 32 determines whether all the depth images out of the multi-view depth image after the image frame conversion process are made the processing target. When it is determined that not all the depth images are made the processing target yet at step S95, the process returns to step S92 and the processes at steps S92 to S95 are repeated until all the depth images are made the processing target.

On the other hand, when it is determined that all the depth images are made the processing target at step S95, the extracting unit 32 supplies the multi-view depth image composed of the depth images before the image frame conversion process corresponding to all the depth images after the image frame conversion process to the viewpoint synthesizing unit 33. Then, the process returns to step S64 in FIG. 11 to shift to step S65.

As described above, the decoding device 30 decodes the encoded bit stream transmitted from the encoding device 10 and extracts the multi-view depth image before the image frame conversion process based on the additional information from the multi-view depth image after the image frame conversion process obtained as a result. Therefore, even when the resolution of the multi-view color image and that of the multi-view depth image are different from each other, it is possible to decode the multi-view color image and the multi-view depth image, which are collectively encoded, to obtain the multi-view color image and the multi-view depth image.

Since the color image specifying information and the depth image specifying information are included in the additional information, it is possible to distinguish the multi-view color image from the multi-view depth image, which are obtained as a result of the decoding, to generate the color image of the display viewpoint.

On the other hand, since the color image specifying information and the depth image specifying information are not included in the additional information in a conventional MVC standard, the decoding device cannot distinguish the multi-view color image from the multi-view depth image.

<Second Embodiment>
[Configuration Example of One Embodiment of Encoding Device]

Figure 14:
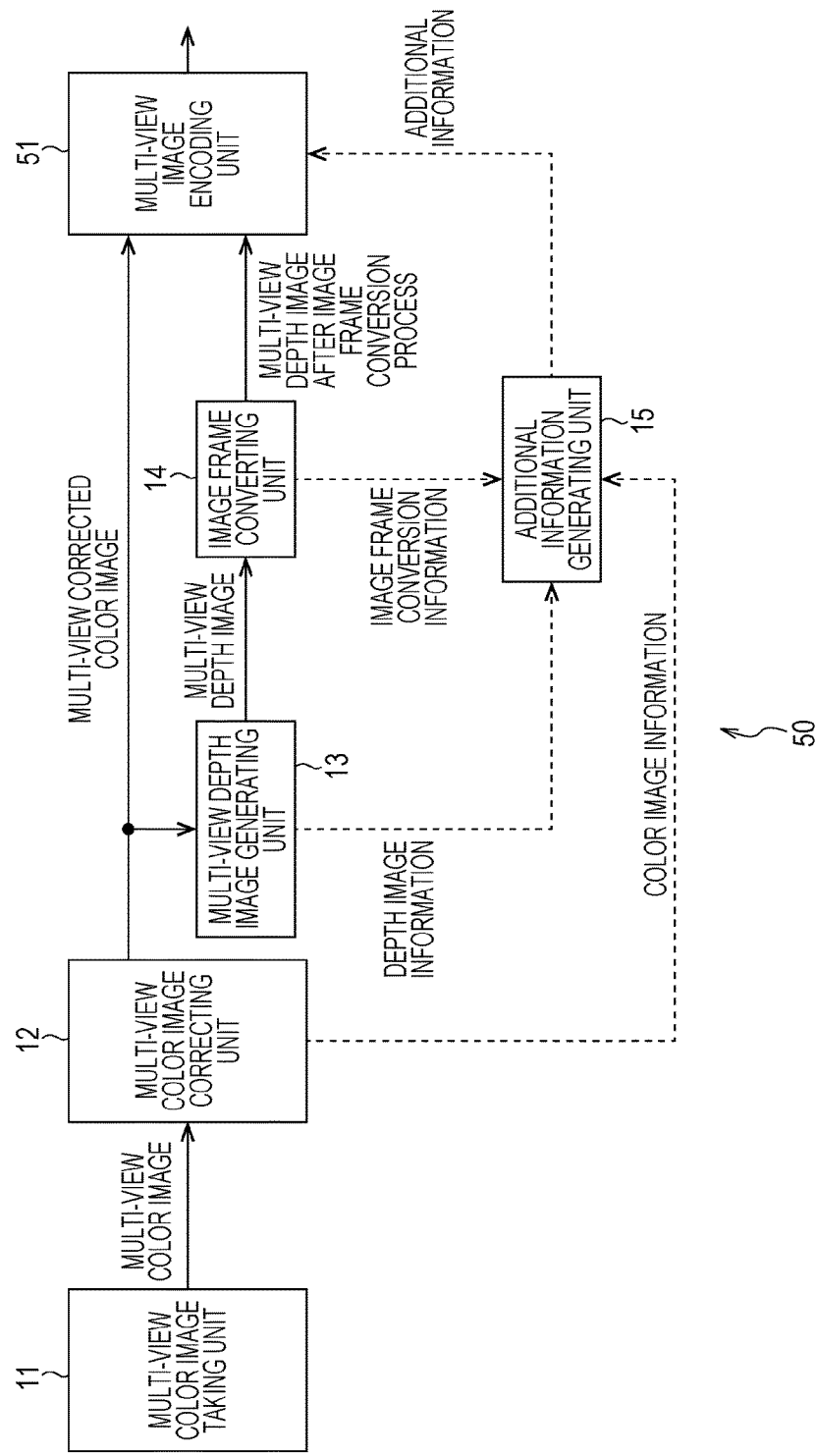
FIG. 14 is a block diagram illustrating a configuration example of a second embodiment of an encoding device as an image processing device to which this technology is applied.

FIG. 14 is a block diagram illustrating a configuration example of a second embodiment of an encoding device as an image processing device to which this technology is applied.

In the configuration illustrated in FIG. 14, the same reference sign is assigned to the configuration the same as that in FIG. 2. Overlapping description is appropriately omitted.

A configuration of an encoding device 50 in FIG. 14 is different from the configuration in FIG. 2 principally in that a multi-view image encoding unit 51 is provided in place of a multi-view image encoding unit 16. The encoding device 50 in FIG. 14 includes a resolution flag and image frame conversion information out of additional information in a Subset SPS and includes information other than the resolution flag and the image frame conversion information in SEI to transmit.

Specifically, the multi-view image encoding unit 51 of the encoding device 50 encodes a multi-view corrected color image from a multi-view color image correcting unit 12 and the multi-view depth image from an image frame converting unit 14 using an MVC scheme as the multi-view image encoding unit 16 in FIG. 2. Then, the multi-view image encoding unit 51 adds an SPS, the Subset SPS including the resolution flag and the image frame conversion information out of the additional information supplied from an additional information generating unit 15, a PPS, the SEI including the information other than the resolution flag and the image frame conversion information out of the additional information and the like to an encoded result. The multi-view image encoding unit 51 transmits a bit stream generated as a result as an encoded bit stream.

[Configuration Example of Encoded Bit Stream]

Figure 15:
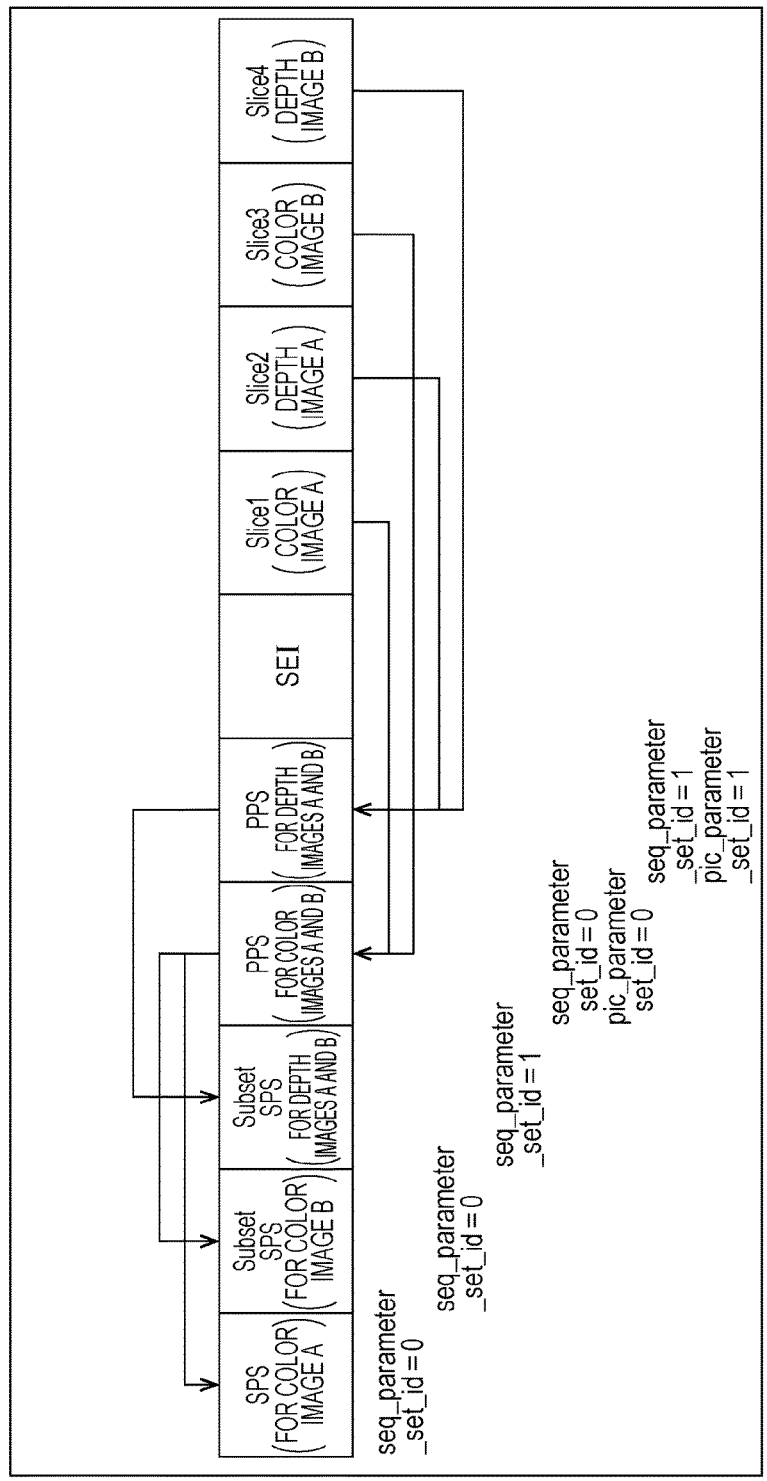
FIG. 15 is a view illustrating another configuration example of an access unit of an encoded bit stream.

FIG. 15 is a view illustrating a configuration example of an access unit of the encoded bit stream generated by the encoding device 50 in FIG. 14.

The configuration of the access unit in FIG. 15 is different from the configuration in FIG. 5 in that the Subset SPS and the PPS of a corrected color image and a depth image after an image frame conversion process encoded as non-base views are separately generated.

Specifically, the access unit in FIG. 15 is composed of the SPS for a color image A, the Subset SPS for a color image B, the Subset SPS for depth images A and B, the PPS for the color images A and B, the PPS for the depth images A and B, and a slice.

The SPS for the color image A is a header including information regarding encoding of a base view. The Subset SPS for the color image B is a header including information regarding the encoding of the color image B out of the base view and the non-base view. Further, the Subset SPS for the depth images A and B is a header including information regarding the encoding of the depth images A and B out of the base view and the non-base view. The image frame conversion information and the resolution flag of the depth images A and B are arranged in the Subset SPS for the depth images A and B.

The PPS for the color images A and B is a header including information indicating an encoding mode of an entire picture of the color images A and B, information for specifying the SPS for the color image A and the Subset SPS for the color image B and the like. In an example in FIG. 15, the information for specifying the SPS for the color image A and the Subset SPS for the color image B included in the PPS for the color images A and B is an inherent ID "0" assigned to the SPS for the color image A and the Subset SPS for the color image B.

The PPS for the depth images A and B is a header including information indicating the encoding mode of an entire picture of the depth images A and B, information for specifying the Subset SPS for the depth images A and B and the like. In the example in FIG. 15, the information for specifying the Subset SPS included in the PPS for the depth images A and B is an inherent ID "1" assigned to the Subset SPS for the depth images A and B.

The SEI includes additive information not essential for decoding such as the number of viewpoints of a multi-view color image, the number of viewpoints of the multi-view depth image, color image specifying information, depth image specifying information and the like out of the additional information generated by the additional information generating unit 15.

Order of arrangement of the slices is similar to that in the case illustrated in FIG. 5 and information for specifying the PPS of the slice is described in a header part of each slice. In the example in FIG. 15, the information for specifying the PPS of the slices of the color images A and B is an inherent ID "0" assigned to the PPS for the color images A and B. Also, the information for specifying the PPS of the slices of the depth images A and B is an inherent ID "1" assigned to the PPS for the depth images A and B.

[Description Example of Part of SPS]

FIG. 16 is a view illustrating a description example of a part of the SPS in FIG. 15.

An inherent ID (seq_parameter_set_id) assigned to the SPS is described in a third row from the top of the SPS in FIG. 16 and a cropping flag (frame_cropping_flag) indicating whether cropping is required in the base view is described in a fifth row thereof. The image frame conversion information is described in each of 7th to 10th rows from the top of the SPS in FIG. 16 when the cropping flag of the base view indicates that the cropping is required.

The encoding device 50 does not perform the image frame conversion process of the base view. Therefore, as illustrated in FIG. 17, 0 is described as the cropping flag in the SPS in the encoded bit stream generated by the encoding device 50 and the image frame conversion information is not described.

[Description Example of Part of Subset SPS]

FIG. 18 is a view illustrating a description example of a part of the Subset SPS in FIG. 15.

The description of the SPS illustrated in FIG. 16 is arranged in a second row from the top of the Subset SPS in FIG. 18 and the inherent ID (seq_parameter_set_id) assigned to the Subset SPS is described in a ninth row thereof. The cropping flag of the non-base view is described in an 11th row from the top of the Subset SPS in FIG. 18. The image frame conversion information is described in each of 13th to 16th rows when the cropping flag of the non-base view indicates that the cropping is required.

The encoding device 50 does not perform the image frame conversion process of the color image encoded as the non-base view. Therefore, as illustrated in FIG. 17, 0 is described as the cropping flag in the Subset SPS for the color image in the encoded bit stream generated by the encoding device 50 and the image frame conversion information is not described.

On the other hand, the encoding device 50 performs the image frame conversion process of the depth image encoded as the non-base view. Therefore, the resolution flag is described as the cropping flag and when the resolution flag indicates that resolutions are different, the image frame conversion information is described. For example, when the resolution of the color image and that of the depth image of a predetermined viewpoint are different from each other, a value 1 of the resolution flag is described as the cropping flag as illustrated in FIG. 19 in the Subset SPS for the depth image and the image frame conversion information is described. In an example in FIG. 19, left offset information, right offset information, top offset information, and bottom offset information out of the image frame conversion information are set to 0, 320, 0, and 180, respectively.

[Configuration Example of Part of SEI]

FIG. 20 is a view illustrating a description example of a part of the SEI in FIG. 15.

First to seventh rows from the top of the SEI in FIG. 20 are the same as the first to seventh rows from the top of the SEI in FIG. 6. That is to say, in the SEI in FIG. 20, the number of viewpoints of the multi-view color image, the number of viewpoints of the multi-view depth image, the color image specifying information, and the depth image specifying information are described and the resolution flag and the image frame conversion information are not described.

[Description of Process of Encoding Device]

Since an encoding process of the encoding device 50 in FIG. 14 is similar to the encoding process in FIG. 7 except a multi-view encoding process, only the multi-view encoding process is described.

Figure 21:
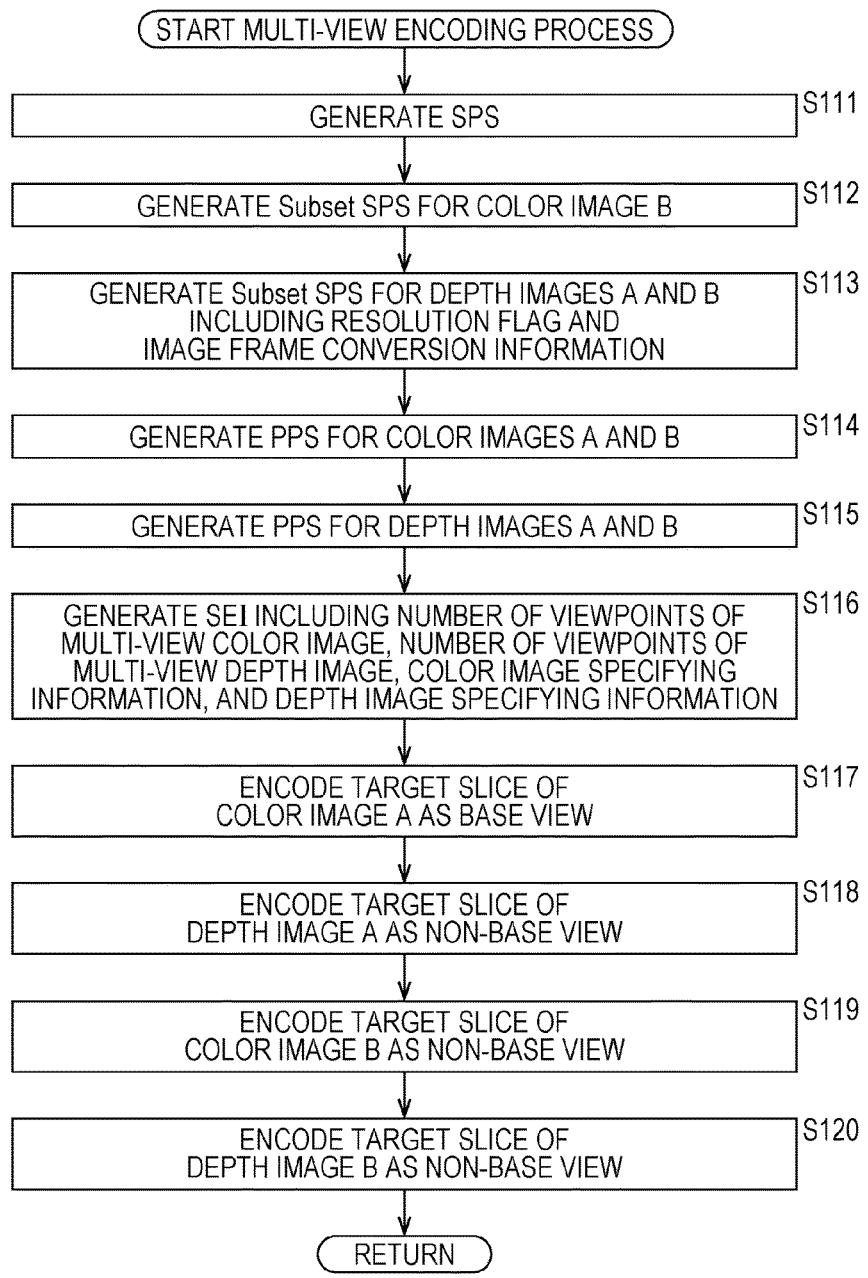
FIG. 21 is a flowchart illustrating a multi-view encoding process of the encoding device in FIG. 14 in detail.

FIG. 21 is a flowchart illustrating the multi-view encoding process of the encoding device 50 in FIG. 14 in detail. The multi-view encoding process is performed for each slice, for example. Also, in the multi-view encoding process in FIG. 21, it is supposed that the images to be encoded are the color image A, the color image B, the depth image A, and the depth image B.

At step S111 in FIG. 21, the multi-view image encoding unit 51 assigns the inherent ID (for example, 0) to the SPS of the target slice and generates the SPS including the ID and 1 as the cropping flag.

At step S112, the multi-view image encoding unit 51 assigns the inherent ID (for example, 0) to the Subset SPS for the color image B of the target slice and generates the Subset SPS for the color image A including the ID and 1 as the cropping flag.

At step S113, the multi-view image encoding unit 51 assigns the inherent ID (for example, 1) to the Subset SPS for the depth images A and B of the target slice and generates the Subset SPS for the depth images A and B including the ID, and the resolution flag and the image frame conversion information out of the additional information.

At step S114, the multi-view image encoding unit 51 generates the PPS for the color images A and B of the target slice including the ID (for example, 0) assigned at steps S111 and S112 and assigns the inherent ID (for example, 0) to the PPS.

At step S115, the multi-view image encoding unit 51 generates the PPS for the depth images A and B of the target slice including the ID (for example, 1) assigned at step S113 and assigns the inherent ID (for example, 1) to the PPS.

At step S116, the multi-view image encoding unit 51 generates the SEI including the number of viewpoints of the multi-view color image, the number of viewpoints of the multi-view depth image, the color image specifying information, and the depth image specifying information out of the additional information of the target slice.

At step S117, the multi-view image encoding unit 51 encodes the target slice of the color image A as the base view and adds the header part including the ID (for example, 0) assigned at step S114. At step S118, the multi-view image encoding unit 51 encodes the target slice of the depth image A as the non-base view and adds the header part including the ID (for example, 1) assigned at step S115.

At step S119, the multi-view image encoding unit 51 encodes the target slice of the color image B as the non-base view and adds the header part including the ID (for example, 0) assigned at step S114. At step S120, the multi-view image encoding unit 51 encodes the target slice of the depth image B as the non-base view and adds the header part including the ID (for example, 1) assigned at step S115.

Then, the multi-view image encoding unit 51 arranges the SPS, the Subset SPS for the color image B, the Subset SPS for the depth images A and B, the PPS for the color images A and B, the PPS for the depth images A and B, and the SEI, which are generated, and the target slice of the color image A, the target slice of the depth image A, the target slice of the color image B, and the target slice of the depth image B, which are encoded, in this order to generate the encoded bit stream. Then, the multi-view encoding process is finished.

Meanwhile, although the SPS is generated for each slice in the multi-view encoding process in FIG. 21 for convenience of description, when the SPS of a current target slice is the same as the SPS of a previous target slice, the SPS is not generated. The same applies to the Subset SPS, the PPS, and the SEI.

[Configuration Example of Second Embodiment of Decoding Device]

Figure 22:
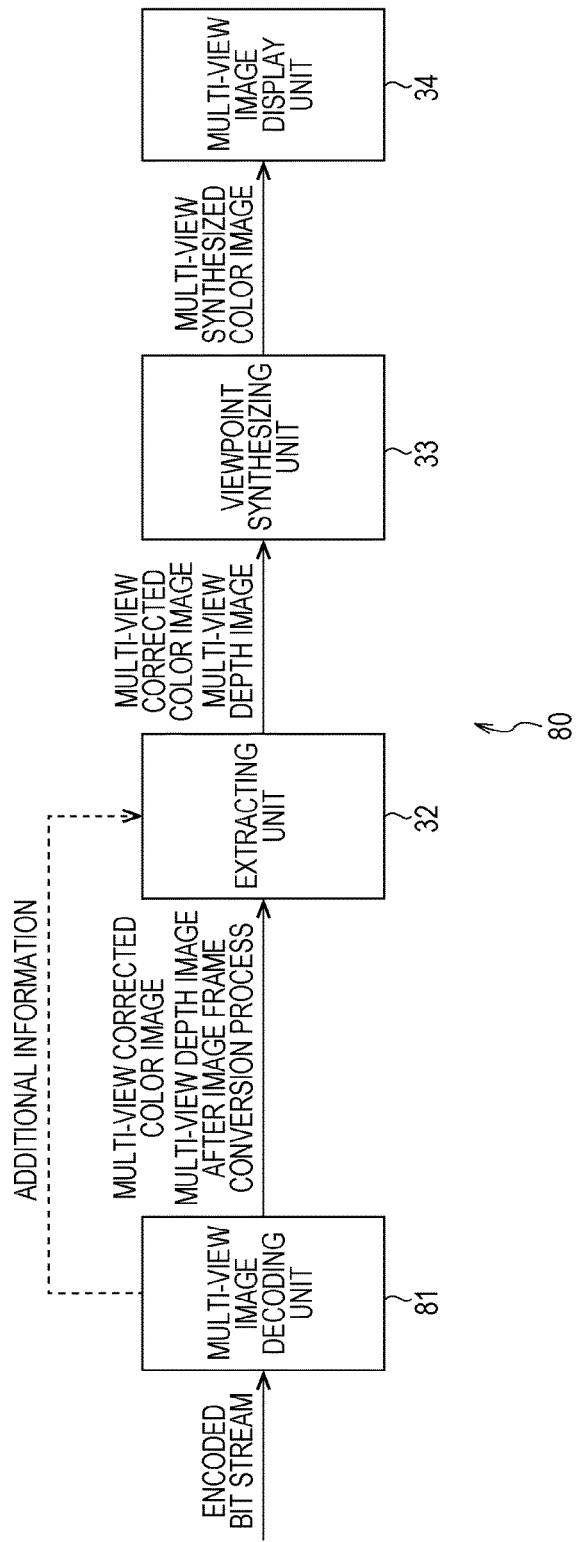
FIG. 22 is a block diagram illustrating a configuration example of a second embodiment of a decoding device as the image processing device to which this technology is applied.

FIG. 22 is a block diagram illustrating a configuration example of a second embodiment of a decoding device as the image processing device to which this technology is applied, which decodes the encoded bit stream transmitted from the encoding device 50 in FIG. 14.

In the configuration illustrated in FIG. 22, the same reference sign is assigned to the configuration the same as that in FIG. 10. Overlapping description is appropriately omitted.

A configuration of a decoding device 80 in FIG. 22 is different from the configuration in FIG. 10 principally in that a multi-view image decoding unit 81 is provided in place of a multi-view image decoding unit 31. The decoding device 80 in FIG. 22 extracts the resolution flag and the image frame conversion information included in the Subset SPS of the encoded bit stream transmitted from the encoding device 50 and extracts the additional information other than the resolution flag and the image frame conversion information included in the SEI.

Specifically, the multi-view image decoding unit 81 of the decoding device 80 receives the encoded bit stream transmitted from the encoding device 50 in FIG. 14. The multi-view image decoding unit 81 extracts the resolution flag and the image frame conversion information included in the Subset SPS of the received encoded bit stream. The multi-view image decoding unit 81 also extracts the number of viewpoints of the multi-view color image, the number of viewpoints of the multi-view depth image, the color image specifying information, and the depth image specifying information included in the SEI. Then, the multi-view image decoding unit 81 supplies the additional information composed of the resolution flag, the image frame conversion information, the number of viewpoints of the multi-view color image, the number of viewpoints of the multi-view depth image, the color image specifying information, and the depth image specifying information, which are extracted, to the extracting unit 32. The multi-view image decoding unit 81 decodes the encoded bit stream using a scheme corresponding to the MVC scheme to generate the multi-view corrected color image and the multi-view depth image after the image frame conversion process and supplies the same to the extracting unit 32 as with the multi-view image decoding unit 31 in FIG. 10.

[Description of Process of Decoding Device]

A decoding process of the decoding device 80 in FIG. 22 is similar to the decoding process in FIG. 11 except a multi-view decoding process, so that only the multi-view decoding process is described.

Figure 23:
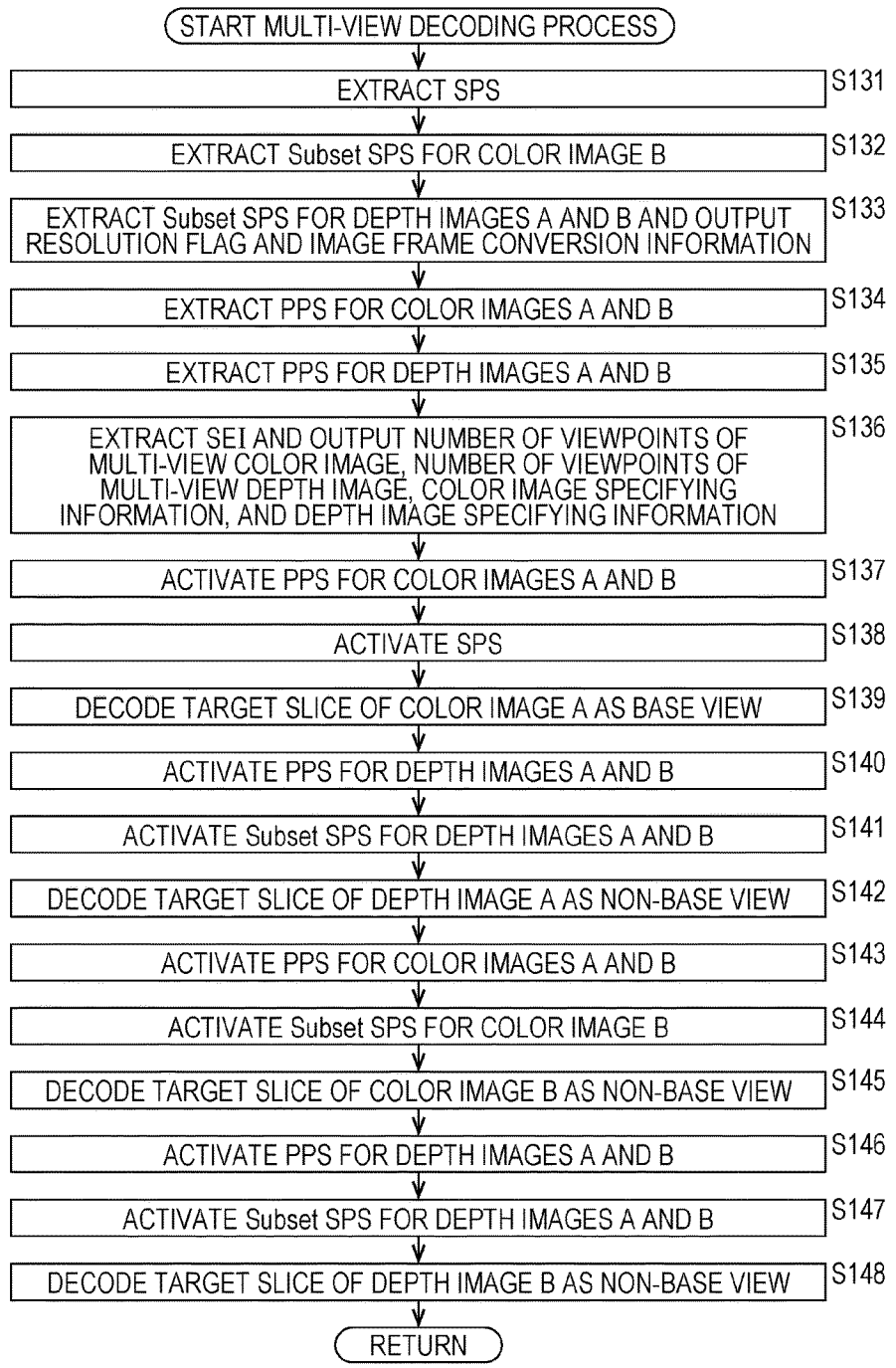
FIG. 23 is a flowchart illustrating a multi-view decoding process of the decoding device in FIG. 22 in detail.

FIG. 23 is a flowchart illustrating the multi-view decoding process of the decoding device 80 in FIG. 22 in detail. The multi-view decoding process is performed for each slice, for example. In the multi-view decoding process in FIG. 23, it is supposed that the images to be decoded are the color image A, the color image B, the depth image A, and the depth image B.

At step S131 in FIG. 23, the multi-view image decoding unit 81 extracts the SPS from the received encoded bit stream. At step S132, the multi-view image decoding unit 81 extracts the Subset SPS for the color image B from the encoded bit stream.

At step S133, the multi-view image decoding unit 81 extracts the Subset SPS for the depth images A and B from the encoded bit stream and outputs the resolution flag and the image frame conversion information included in the Subset SPS to the extracting unit 32. At step S134, the multi-view image decoding unit 81 extracts the PPS for the color images A and B from the encoded bit stream.

At step S135, the multi-view image decoding unit 81 extracts the PPS for the depth images A and B from the encoded bit stream.

At step S136, the multi-view image decoding unit 81 extracts the SEI from the encoded bit stream and outputs the number of viewpoints of the multi-view color image, the number of viewpoints of the multi-view depth image, the color image specifying information, and the depth image specifying information included in the SEI to the extracting unit 32.

At step S137, based on the ID (for example, 0) of the PPS for the color images A and B included in the header of the target slice of the color image A, the multi-view image decoding unit 81 activates the PPS for the color images A and B to which the ID is assigned. At step S138, based on the ID (for example, 0) of the SPS included in the PPS for the color images A and B activated at step S137, the multi-view image decoding unit 81 activates the SPS to which the ID is assigned.

At step S139, the multi-view image decoding unit 81 decodes the target slice of the color image A as the base view with reference to the PPS for the color images A and B and the SPS, which are activated, and supplies the same to the extracting unit 32.

At step S140, based on the ID (for example, 1) of the PPS for the depth images A and B included in the header of the target slice of the depth image A, the multi-view image decoding unit 81 activates the PPS for the depth images A and B to which the ID is assigned.

At step S141, based on the ID (for example, 1) of the Subset SPS for the depth images A and B included in the PPS for the depth images A and B activated at step S140, the multi-view image decoding unit 81 activates the Subset SPS for the depth images A and B to which the ID is assigned.

At step S142, the multi-view image decoding unit 81 decodes the target slice of the depth image A as the non-base view with reference to the PPS and the Subset SPS for the depth images A and B, which are activated, and supplies the same to the extracting unit 32.

At step S143, based on the ID (for example, 0) of the PPS for the color images A and B included in the header of the target slice of the color image B, the multi-view image decoding unit 81 activates the PPS for the color images A and B to which the ID is assigned.

At step S144, based on the ID (for example, 0) of the Subset SPS for the color image B included in the PPS for the color images A and B activated at step S143, the multi-view image decoding unit 81 activates the Subset SPS for the color image B to which the ID is assigned.

At step S145, the multi-view image decoding unit 81 decodes the target slice of the color image B as the non-base view with reference to the PPS for the color images A and B and the Subset SPS for the color image B, which are activated, and supplies the same to the extracting unit 32.

At step S146, based on the ID (for example, 1) of the PPS for the depth images A and B included in the header of the target slice of the depth image B, the multi-view image decoding unit 81 activates the PPS for the depth images A and B to which the ID is assigned.

At step S147, based on the ID (for example, 1) of the Subset SPS for the depth images A and B included in the PPS for the depth images A and B activated at step S146, the multi-view image decoding unit 81 activates the Subset SPS for the depth images A and B to which the ID is assigned.

At step S148, the multi-view image decoding unit 81 decodes the target slice of the depth image B as the non-base view with reference to the PPS and the Subset SPS for the depth images A and B, which are activated, and supplies the same to the extracting unit 32. Then, the multi-view decoding process is finished.

Meanwhile, although it is supposed that the SPS, the Subset SPS, the PPS, and the SEI are generated for all the slices and always extracted for each slice for convenience of description in the multi-view decoding process in FIG. 23, when there is the slice, the SPS, the Subset SPS, the PPS, and the SEI of which are not generated, a process to extract the SPS, the Subset SPS, the PPS, and the SEI is skipped.

Although the multi-view depth image is generated from the multi-view corrected color image in this embodiment, this may be generated by a sensor, which detects a parallax value and a depth value (depth information) when the multi-view color image is taken.

It may be configured that only one of the color image specifying information and the depth image specifying information is included in the additional information. In this case, the decoding device 30 (80) specifies the image, which is not specified out of the multi-view color image and the multi-view depth image, as the image, which is not specified. For example, when only the color image specifying information is included in the additional information, the decoding device 30 specifies the multi-view color image based on the color image specifying information and specifies the other image as the multi-view depth image.

The method of transmitting the additional information is not limited to the above-described example, and the additional information may also be transmitted in a state included in the SPS, the PPS and the like of a VCL (video coding layer) and an NAL (network abstraction layer).

<Third Embodiment>
[Description of Computer to which this Technology is Applied]

A series of processes described above may be performed by hardware or by software. When a series of processes are performed by the software, a program, which composes the software, is installed on a multi-purpose computer and the like.

Figure 25:
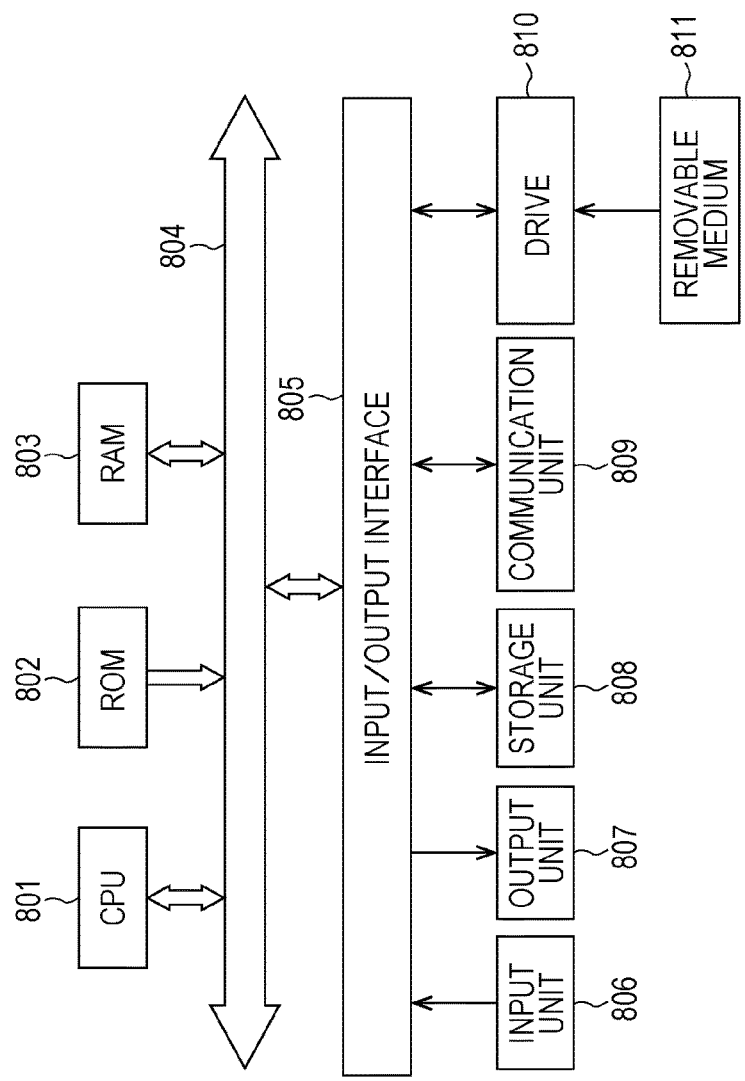
FIG. 25 is a view illustrating a configuration example of one embodiment of a computer.

FIG. 25 illustrates a configuration example of one embodiment of the computer on which the program, which executes a series of processes described above, is installed.

The program may be recorded in advance in a storage unit 808 and a ROM (read only memory) 802 as a recording medium embedded in the computer.

Alternatively, the program may be stored (recorded) in a removable medium 811. Such removable medium 811 may be provided as so-called packaged software. Herein, the removable medium 811 includes a flexible disk, a CD-ROM (compact disc read only memory), an MO (magneto-optical) disk, a DVD (digital versatile disc), a magnetic disk, a semiconductor memory and the like, for example.

Meanwhile, the program may be installed on the computer from the above-described removable medium 811 by means of a drive 810 or may be downloaded to the computer through a communication network and a broadcast network to be installed on the embedded storage unit 808. That is to say, the program may be wirelessly transmitted from a downloading site to the computer through a satellite for digital satellite broadcasting or may be transmitted by wire to the computer through the network such as a LAN (local area network) and the Internet, for example.

A CPU (central processing unit) 801 is embedded in the computer and an input/output interface 805 is connected to the CPU 801 through a bus 804.

When an instruction is input by operation and the like of an input unit 806 by a user through the input/output interface 805, the CPU 801 executes the program stored in the ROM 802 according to this. Alternatively, the CPU 801 loads the program stored in the storage unit 808 onto a RAM (random access memory) 803 to execute.

According to this, the CPU 801 performs the process according to the above-described flowchart or the process performed by the configuration of the above-described block diagram. Then, the CPU 801 outputs a processing result from an output unit 807 or transmits the same from a communication unit 809 and further records the same on the storage unit 808 through the input/output interface 805, for example, as needed.

Meanwhile, the input unit 806 is composed of a keyboard, a mouse, a microphone and the like. The output unit 807 is composed of an LCD (liquid crystal display), a speaker and the like.

Herein, in this specification, the process performed by the computer according to the program is not necessarily performed in chronological order along the order described as the flowchart. That is to say, the process performed by the computer according to the program also includes the process executed in parallel or independently executed (for example, a parallel process or a process by an object).

Also, the program may be processed by one computer (processor) or processed by a plurality of computers. Further, the program may be transmitted to a remote computer to be executed.

This technology is applicable to an image processing device used when communication is made through a network medium such as satellite broadcasting, cable TV (television), the Internet, and a mobile phone, or when it is processed on a storage medium such as an optical disk, the magnetic disk, and a flash memory.

The above-described image processing device is applicable to an optional electronic device. An example thereof is hereinafter described.

<Fourth Embodiment>
[Configuration Example of Television Device]

Figure 26:
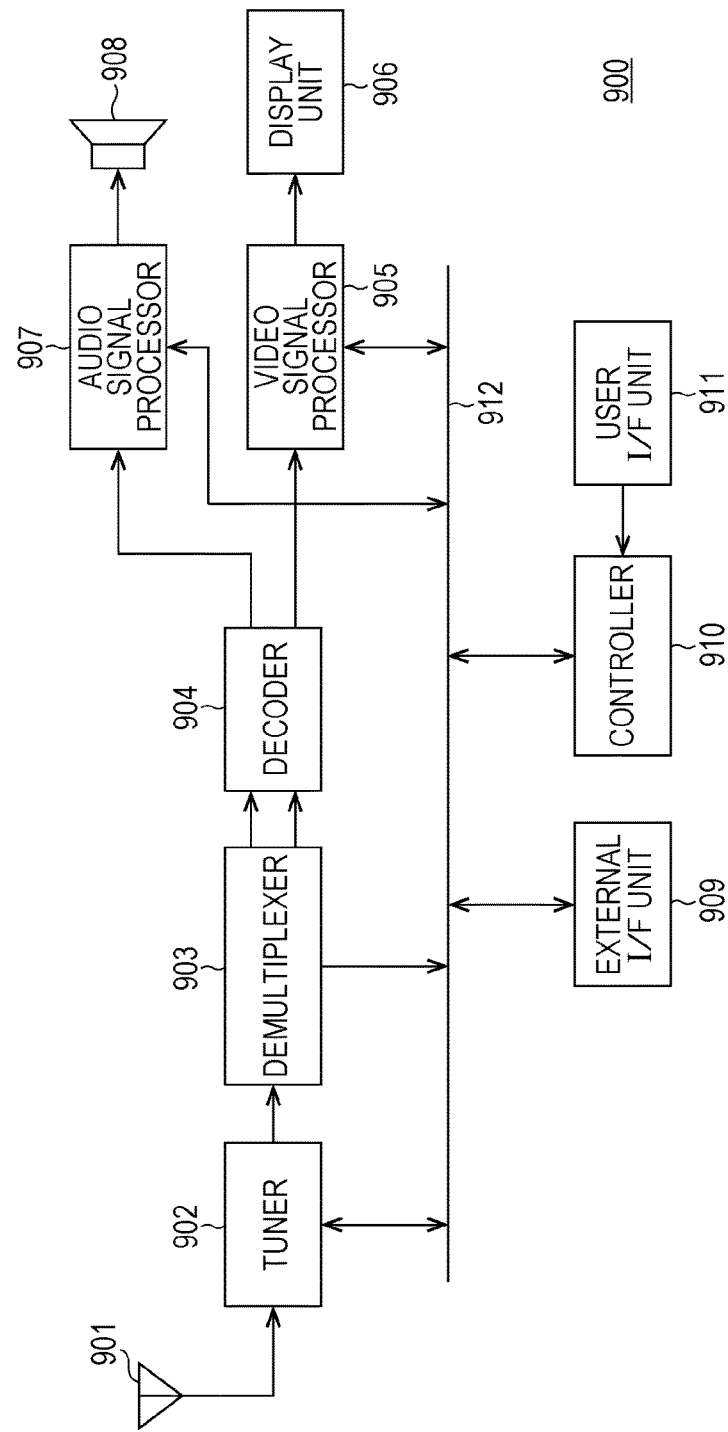
FIG. 26 is a view illustrating a schematic configuration example of a television device to which this technology is applied.

FIG. 26 illustrates a schematic configuration of a television device to which this technology is applied. A television device 900 includes an antenna 901, a tuner 902, a demultiplexer 903, a decoder 904, a video signal processor 905, a display unit 906, an audio signal processor 907, a speaker 908, and an external interface unit 909. Further, the television device 900 includes a controller 910, a user interface unit 911 and the like.

The tuner 902 selects an intended channel from a broadcast wave signal received by the antenna 901 to demodulate and outputs an obtained encoded bit stream to the demultiplexer 903.

The demultiplexer 903 extracts a packet of video and audio of a program to be watched from the encoded bit stream and outputs data of the extracted packet to the decoder 904. The demultiplexer 903 supplies the packet of data such as EPG (electronic program guide) to the controller 910. Meanwhile, when scrambling is applied, the scrambling is cancelled by the demultiplexer and the like.

The decoder 904 performs a decoding process of the packet and outputs video data and audio data generated by the decoding process to the video signal processor 905 and the audio signal processor 907, respectively.

The video signal processor 905 performs noise reduction, video processing according to user setting and the like of the video data. The video signal processor 905 generates the video data of a program to be displayed on the display unit 906 and image data according to a process based on an application supplied through a network. The video signal processor 905 also generates the video data for displaying a menu screen and the like for selecting an item and the like and superimposes the same on the video data of the program. The video signal processor 905 generates a drive signal based on the video data generated in this manner to drive the display unit 906.

The display unit 906 drives a display device (for example, a liquid crystal display device and the like) based on the drive signal from the video signal processor 905 to display video of the program and the like.

The audio signal processor 907 applies a predetermined process such as the noise reduction to the audio data, performs a D/A conversion process and an amplifying process of the audio data after the process and supplies the same to the speaker 908, thereby outputting audio.

The external interface unit 909 is an interface for connecting to an external device and the network and this transmits and receives the data such as the video data and the audio data.

The user interface unit 911 is connected to the controller 910. The user interface unit 911 is composed of an operating switch, a remote control signal receiving unit and the like and supplies an operation signal according to user operation to the controller 910.

The controller 910 is composed of a CPU (central processing unit), a memory and the like. The memory stores a program executed by the CPU, various data necessary for the CPU to perform a process, the EPG data, the data obtained through the network and the like. The program stored in the memory is read by the CPU at predetermined timing such as on start-up of the television device 900 to be executed. The CPU executes the program to control each unit such that the television device 900 operates according to the user operation.

Meanwhile, the television device 900 is provided with a bus 912 for connecting the tuner 902, the demultiplexer 903, the video signal processor 905, the audio signal processor 907, the external interface unit 909 and the like to the controller 910.

In the television device configured in this manner, the decoder 904 is provided with a function of an image processing device (image processing method) of this application. Therefore, a color image and a depth image of different resolutions, which are collectively encoded, may be decoded.

<Fifth Embodiment>

[Configuration Example of Mobile Phone]

Figure 27:
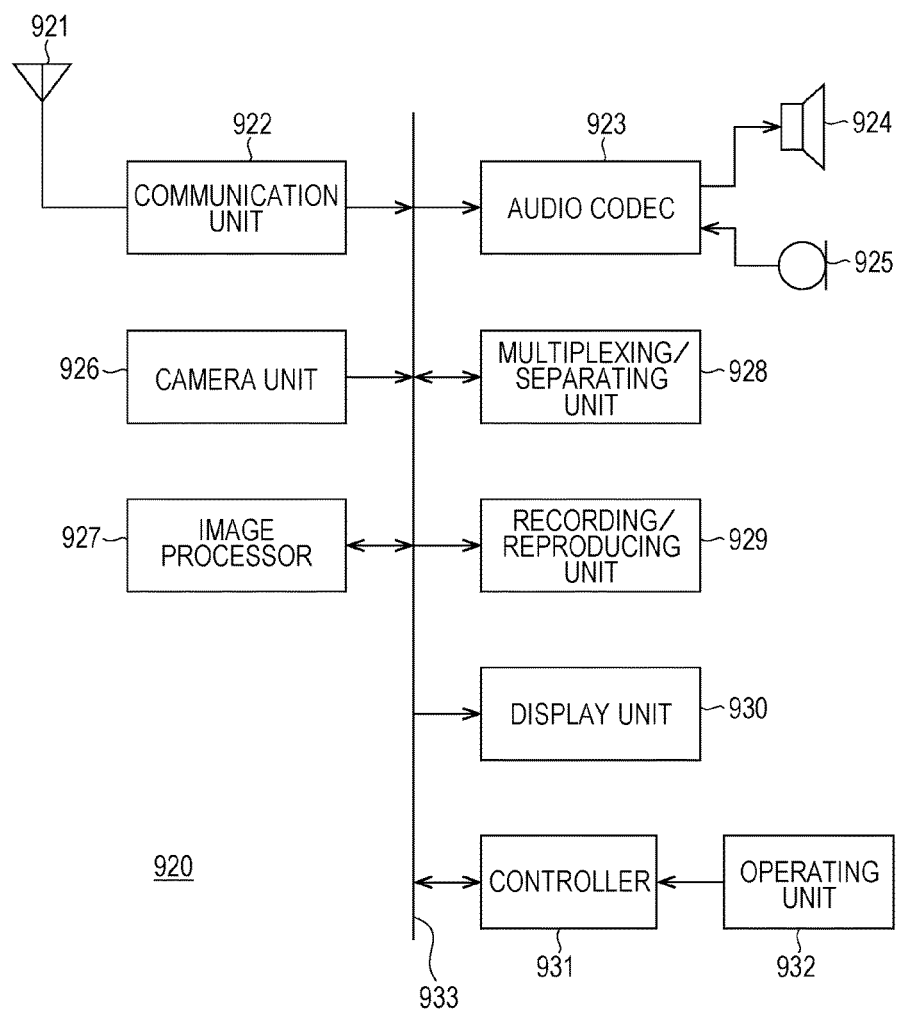
FIG. 27 is a view illustrating a schematic configuration example of a mobile phone to which this technology is applied.

FIG. 27 illustrates a schematic configuration of a mobile phone to which this technology is applied. A mobile phone 920 includes a communication unit 922, an audio codec 923, a camera unit 926, an image processor 927, a multiplexing/separating unit 928, a recording/reproducing unit 929, a display unit 930, and a controller 931. They are connected to each other through a bus 933.

An antenna 921 is connected to the communication unit 922, and a speaker 924 and a microphone 925 are connected to the audio codec 923. Further, an operating unit 932 is connected to the controller 931.

The mobile phone 920 performs various pieces of operation such as transmission and reception of an audio signal, transmission and reception of e-mail and image data, image taking, and data recording in various modes such as an audio call mode and a data communication mode.

In the audio call mode, the audio signal generated by the microphone 925 is converted to audio data and compressed by the audio codec 923 to be supplied to the communication unit 922. The communication unit 922 performs a modulation process, a frequency conversion process and the like of the audio data to generate a transmitting signal. The communication unit 922 supplies the transmitting signal to the antenna 921 to transmit to a base station not illustrated. The communication unit 922 also amplifies a received signal received by the antenna 921 and performs the frequency conversion process, a demodulation process and the like thereof, then supplies the obtained audio data to the audio codec 923. The audio codec 923 decompresses the audio data and converts the same to an analog audio signal to output the same to the speaker 924.

Also, when the mail is transmitted in the data communication mode, the controller 931 accepts character data input by operation of the operating unit 932 and displays an input character on the display unit 930. The controller 931 also generates mail data based on a user instruction and the like in the operating unit 932 and supplies the same to the communication unit 922. The communication unit 922 performs the modulation process, the frequency conversion process and the like of the mail data and transmits the obtained transmitting signal from the antenna 921. The communication unit 922 amplifies the received signal received by the antenna 921 and performs the frequency conversion process, the demodulation process and the like thereof, thereby restoring the mail data. The mail data is supplied to the display unit 930 and a mail content is displayed.

Meanwhile, the mobile phone 920 may also store the received mail data in a storage medium by the recording/reproducing unit 929. The storage medium is an optional rewritable storage medium. For example, the storage medium is a semiconductor memory such as a RAM and an embedded flash memory, and a removable medium such as a hard disk, a magnetic disk, a magneto-optical disk, an optical disk, a USB memory, and a memory card.

When the image data is transmitted in the data communication mode, the image data generated by the camera unit 926 is supplied to the image processor 927. The image processor 927 performs an encoding process of the image data to generate encoded data.

The multiplexing/separating unit 928 multiplexes the encoded data generated by the image processor 927 and the audio data supplied from the audio codec 923 using a predetermined scheme and supplies the same to the communication unit 922. The communication unit 922 performs the modulation process, the frequency conversion process and the like of multiplexed data and transmits the obtained transmitting signal from the antenna 921. The communication unit 922 also amplifies the received signal received by the antenna 921 and performs the frequency conversion process, the demodulation process and the like thereof, thereby restoring the multiplexed data. The multiplexed data is supplied to the multiplexing/separating unit 928. The multiplexing/separating unit 928 separates the multiplexed data and supplies the encoded data and the audio data to the image processor 927 and the audio codec 923, respectively. The image processor 927 performs a decoding process of the encoded data to generate the image data. The image data is supplied to the display unit 930 and the received image is displayed. The audio codec 923 converts the audio data to the analog audio signal and supplies the same to the speaker 924 to output received audio.

In the mobile phone device configured in this manner, the image processor 927 is provided with a function of an image processing device (image processing method) of this application. Therefore, it is possible to collectively encode a color image and a depth image of different resolutions. The collectively encoded color image and depth image of different resolutions may be decoded.

<Sixth Embodiment>
[Configuration Example of Recording/Reproducing Device]

Figure 28:
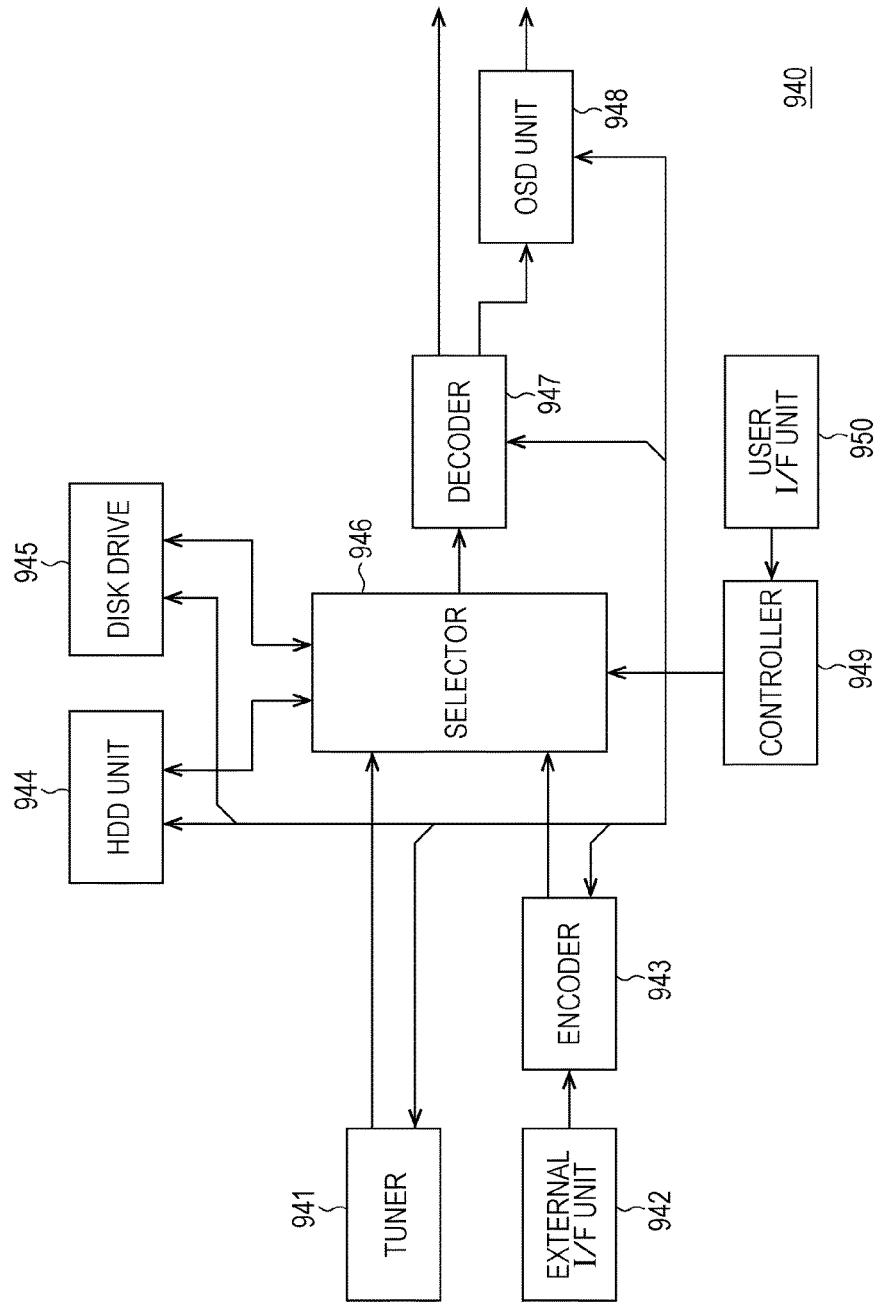
FIG. 28 is a view illustrating a schematic configuration example of a recording/reproducing device to which this technology is applied.

FIG. 28 illustrates a schematic configuration of a recording/reproducing device to which this technology is applied. A recording/reproducing device 940 records audio data and video data of a received broadcast program on a recording medium, for example, and provides the recorded data to a user at timing according to an instruction of the user. The recording/reproducing device 940 may also obtain the audio data and the video data from another device, for example, and record them on the recording medium. Further, the recording/reproducing device 940 may decode the audio data and the video data recorded on the recording medium to output, thereby displaying an image and outputting audio by a monitor device and the like.

The recording/reproducing device 940 includes a tuner 941, an external interface unit 942, an encoder 943, a HDD (hard disk drive) unit 944, a disk drive 945, a selector 946, a decoder 947, an OSD (on-screen display) unit 948, a controller 949, and a user interface unit 950.

The tuner 941 selects an intended channel from a broadcast signal received by an antenna not illustrated. The tuner 941 outputs an encoded bit stream obtained by demodulating a received signal of the intended channel to the selector 946.

The external interface unit 942 is composed of at least any one of an IEEE1394 interface, a network interface unit, a USB interface, a flash memory interface and the like. The external interface unit 942 is an interface for connecting to an external device, a network, a memory card and the like, and receives the data such as the video data and the audio data to be recorded.

When the video data and the audio data supplied from the external interface unit 942 are not encoded, the encoder 943 encodes them using a predetermined scheme and outputs the encoded bit stream to the selector 946.

The HDD unit 944 records contents data such as video and audio, various programs, another data and the like on an embedded hard disk and reads them from the hard disk at the time of reproduction and the like.

The disk drive 945 records and reproduces a signal on and from an optical disk mounted thereon. The optical disk is a DVD (DVD-Video, DVD-RAM, DVD-R, DVD-RW, DVD+R, DVD+RW and the like), a Blu-ray Disc and the like, for example.

The selector 946 selects the encoded bit stream from the tuner 941 or the encoder 943 and supplies the same to the HDD unit 944 or the disk drive 945 when recording the video and the audio. The selector 946 also supplies the encoded bit stream output from the HDD unit 944 or the disk drive 945 to the decoder 947 when reproducing the video and the audio.

The decoder 947 performs a decoding process of the encoded bit stream. The decoder 947 supplies the video data generated by the decoding process to the OSD unit 948. The decoder 947 outputs the audio data generated by the decoding process.

The OSD unit 948 generates the video data for displaying a menu screen and the like for selecting an item and the like and superimposes the same on the video data output from the decoder 947 to output.

The user interface unit 950 is connected to the controller 949. The user interface unit 950 is composed of an operating switch, a remote control signal receiving unit and the like and supplies an operation signal according to a user operation to the controller 949.

The controller 949 is composed of a CPU, a memory and the like. The memory stores a program executed by the CPU and various data necessary for the CPU to perform a process. The program stored in the memory is read by the CPU at predetermined timing such as on start-up of the recording/reproducing device 940 to be executed. The CPU executes the program to control each unit such that the recording/reproducing device 940 operates according to user operation.

In the recording/reproducing device configured in this manner, the decoder 947 is provided with a function of an image processing device (image processing method) of this application. Therefore, a color image and a depth image of different resolutions, which are collectively encoded, may be decoded.

<Seventh Embodiment>
[Configuration Example of Image Taking Device]

Figure 29:
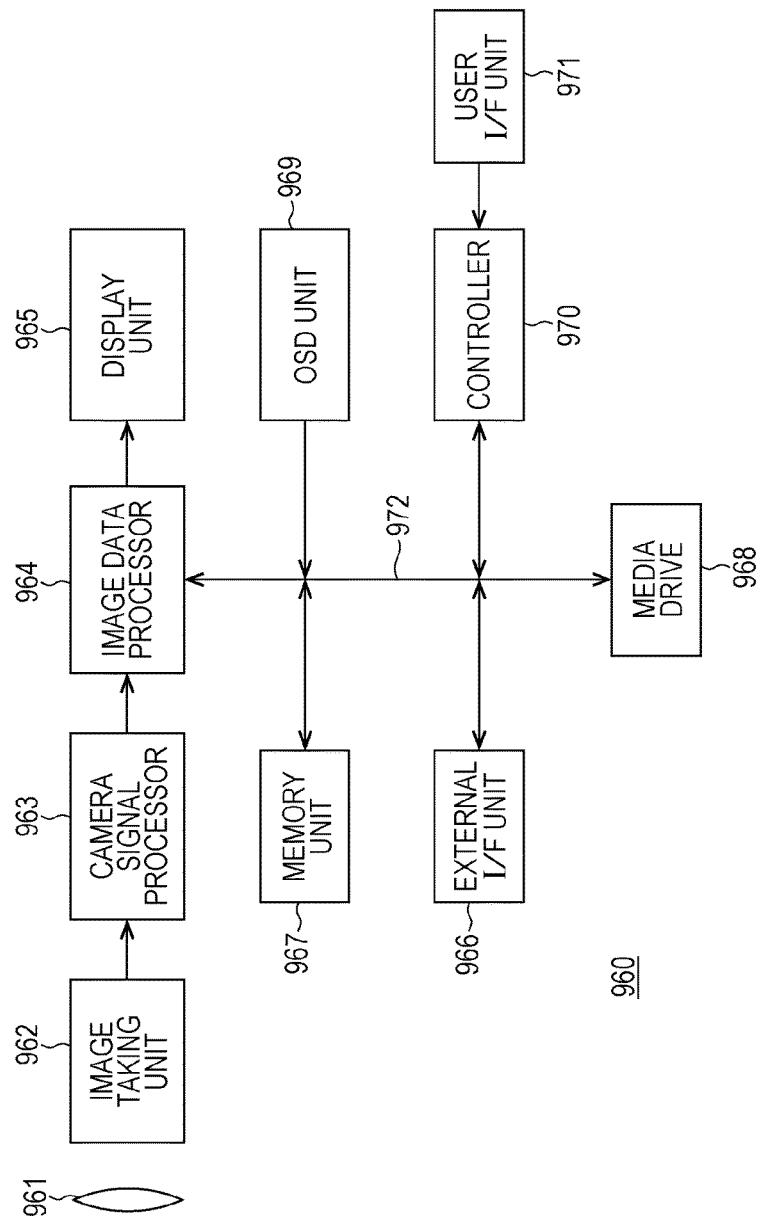
FIG. 29 is a view illustrating a schematic configuration example of an image taking device to which this technology is applied.

FIG. 29 illustrates a schematic configuration of an image taking device to which this technology is applied. An image taking device 960 takes an image of a subject and displays the image of the subject on a display unit or records the same on a recording medium as image data.

The image taking device 960 includes an optical block 961, an image taking unit 962, a camera signal processor 963, an image data processor 964, a display unit 965, an external interface unit 966, a memory unit 967, a media drive 968, an OSD unit 969, and a controller 970. A user interface unit 971 is connected to the controller 970. Further, the image data processor 964, the external interface unit 966, the memory unit 967, the media drive 968, the OSD unit 969, the controller 970 and the like are connected to each other through a bus 972.

The optical block 961 is composed of a focus lens, a diaphragm mechanism and the like. The optical block 961 forms an optical image of the subject on an imaging area of the image taking unit 962. The image taking unit 962 composed of a CCD or a CMOS image sensor generates an electric signal according to the optical image by photoelectric conversion and supplies the same to the camera signal processor 963.

The camera signal processor 963 applies various camera signal processes such as Knee correction, gamma correction, and color correction to the electric signal supplied from the image taking unit 962. The camera signal processor 963 supplies the image data after the camera signal process to the image data processor 964.

The image data processor 964 performs an encoding process of the image data supplied from the camera signal processor 963. The image data processor 964 supplies encoded data generated by the encoding process to the external interface unit 966 and the media drive 968. The image data processor 964 also performs a decoding process of the encoded data supplied from the external interface unit 966 and the media drive 968. The image data processor 964 supplies the image data generated by the decoding process to the display unit 965. The image data processor 964 performs a process to supply the image data supplied from the camera signal processor 963 to the display unit 965 and superimpose data for display obtained from the OSD unit 969 on the image data to supply to the display unit 965.

The OSD unit 969 generates the data for display such as a menu screen and an icon formed of a sign, a character, or a figure and outputs the same to the image data processor 964.

The external interface unit 966 is composed of a USB input/output terminal and the like, for example, and is connected to a printer when the image is printed. A drive is connected to the external interface unit 966 as needed, a removable medium such as a magnetic disk and an optical disk is appropriately mounted thereon, and a computer program read therefrom is installed as needed. Further, the external interface unit 966 includes a network interface connected to a predetermined network such as a LAN and the Internet. The controller 970 may read the encoded data from the memory unit 967 and supply the same from the external interface unit 966 to another device connected through the network according to an instruction from the user interface unit 971, for example. The controller 970 may also obtain the encoded data and the image data supplied from another device through the network through the external interface unit 966 and supply the same to the image data processor 964.

An optional readable/writable removable medium such as the magnetic disk, a magneto-optical disk, the optical disk, and a semiconductor memory, for example, is used as a recording medium driven by the media drive 968. An optional type of the removable medium may be used as the recording medium: this may be a tape device, a disk, or a memory card. Of course, a non-contact IC card and the like may be used.

It is also possible to integrate the media drive 968 and the recording medium such that this is composed of a non-portable storage medium as an embedded hard disk drive, an SSD (solid state drive) and the like, for example.

The controller 970 is composed of a CPU, a memory and the like. The memory stores the program executed by the CPU, various data necessary for the CPU to perform a process and the like. The program stored in the memory is read by the CPU at predetermined timing such as on start-up of the image taking device 960 to be executed. The CPU executes the program to control each unit such that the image taking device 960 operates according to user operation.

In the image taking device configured in this manner, the image data processor 964 is provided with a function of an image processing device (image processing method) of this application. Therefore, it is possible to collectively encode a color image and a depth image of different resolutions. The color image and the depth image of different resolutions, which are collectively encoded, may be decoded.

The embodiments of this technology are not limited to the above-described embodiments and various modifications may be made without departing from the scope of this technology.

Meanwhile, this technology may also have a following configuration.

(1)

An image processing device, including:
a resolution converting unit, which converts a resolution of a depth image to the same resolution as the resolution of a color image;
a generating unit, which generates additional information including information to specify the color image or the depth image, conversion information, which indicates an area of an image included in the depth image, the resolution of which is converted by the resolution converting unit, and resolution information to distinguish whether the resolution of the color image and the resolution of the depth image are different from each other; and
a transmitting unit, which transmits the color image, the depth image, and the additional information generated by the generating unit.

(2)

The image processing device according to the above-described (1),
further including:
an encoding unit, which encodes the color image and the depth image to generate a bit stream, wherein
the transmitting unit transmits the bit stream encoded by the encoding unit and the additional information generated by the generating unit.

(3)

The image processing device according to the above-described (2), wherein
the encoding unit encodes the color image and the depth image using an MVC (multiview video coding) scheme and generates the additional information as SEI (supplemental enhancement information) being supplemental information of the bit stream.

(4)

The image processing device according to the above-described (2), wherein
the encoding unit encodes the color image and the depth image using an MVC (multiview video coding) scheme, generates information to specify the color image or the depth image as SEI (supplemental enhancement information) being supplemental information of the bit stream, and generates the conversion information and the resolution information as a Subset SPS (sequence parameter set) of the bit stream.

(5)

The image processing device according to any one of the above-described (1) to (4), wherein
the resolution converting unit converts the resolution of the depth image to the same resolution as the resolution of the color image by adding the image to the depth image, the resolution of which is lower than the resolution of the color image.

(6)

An image processing method, including:
a resolution converting step of converting a resolution of a depth image to the same resolution as the resolution of a color image;

a generating step of generating additional information including information to specify the color image or the depth image, conversion information, which indicates an area of an image included in the depth image, the resolution of which is converted by a process at the resolution converting step, and resolution information to distinguish whether the resolution of the color image and the resolution of the depth image are different from each other; and a transmitting step of transmitting the color image, the depth image, and the additional information generated by a process at the generating step of an image processing device.

(7)

An image processing device, including:

a receiving unit, which receives a color image, a depth image, a resolution of which is converted to the same resolution as the resolution of the color image, and additional information including information to specify the color image or the depth image, conversion information, which indicates an area of an image included in the depth image, and resolution information to distinguish whether the resolution of the color image and the resolution of the depth image are different from each other;

an extracting unit, which extracts a depth image before resolution conversion from the depth image based on the additional information received by the receiving unit; and a generating unit, which generates a new color image using the color image and the depth image extracted by the extracting unit.

(8)

The image processing device according to the above-described (7), further including:

a decoding unit, which decodes a bit stream obtained by encoding the color image and the depth image, wherein the receiving unit receives the bit stream and the additional information, the decoding unit decodes the bit stream received by the receiving unit to generate the color image and the depth image, and the extracting unit extracts the depth image before resolution conversion from the depth image generated by the decoding unit based on the additional information.

(9)

The image processing device according to the above-described (8), wherein the receiving unit receives the bit stream obtained by encoding the color image and the depth image using an MVC (multiview video coding) scheme and the additional information generated as SEI (supplemental enhancement information) being supplemental information of the bit stream.

(10)

The image processing device according to the above-described (8), wherein the receiving unit receives the bit stream obtained by encoding the color image and the depth image using an MVC (multiview video coding) scheme, information to specify the color image or the depth image generated as SEI (supplemental enhancement information) being supplemental information of the bit stream, and the conversion information and the resolution information generated as a Subset SPS (sequence parameter set) of the bit stream.

(11)

The image processing device according to any one of the above-described (7) to (10), wherein the resolution of the depth image is converted to the same resolution as the resolution of the color image by addition of the image to the depth image, the resolution of which is lower than the resolution of the color image.

(12)

An image processing method, including:

a receiving step of receiving a color image, a depth image, a resolution of which is converted to the same resolution as the resolution of the color image, and additional information including information to specify the color image or the depth image, conversion information, which indicates an area of an image included in the depth image, and resolution information to distinguish whether the resolution of the color image and the resolution of the depth image are different from each other;

an extracting step of extracting a depth image before resolution conversion from the depth image based on the additional information received by a process at the receiving step; and a generating step of generating a new color image using the color image and the depth image extracted by a process at the extracting step of an image processing device.

REFERENCE SIGNS LIST 10 encoding device, 14 image frame converting unit, 15 additional information generating unit, 16 multi-view image encoding unit, 30 decoding device, 31 multi-view image decoding unit, 32 extracting unit, 33 viewpoint synthesizing unit, 50 encoding device, 51 multi-view image encoding unit, 80 decoding device, 81 multi-view image decoding unit

The invention claimed is:

1. An image processing device, comprising:
one or more processors configured to:
generate additional information that includes information to specify:
a color image of a subject and a first depth image of the subject;
conversion information that indicates a difference between a first number of pixels of a second depth image of the subject and a second number of pixels of the first depth image,
wherein a first resolution of the second depth image is based on a second resolution of the first depth image,
wherein the first resolution of the second depth image is same as a third resolution of the color image; and
resolution information that indicates the third resolution of the color image and the second resolution of the first depth image;
encode, based on the additional information, the color image and the second depth image to generate an encoded bit stream,
wherein the encoded bit stream comprises the additional information as SEI (supplemental enhancement information) in the encoded bit stream; and
transmit the encoded bit stream.

2. The image processing device according to claim 1, wherein the one or more processors are further configured to encode the color image and the second depth image, based on an MVC (multiview video coding) scheme.

3. The image processing device according to claim 1, wherein the one or more processors are further configured to:
encode the color image and the second depth image, based on an MVC (multiview video coding) scheme,
wherein the additional information specifies:
the color image and the first depth image as SEI in the encoded bit stream; and
the conversion information and the resolution information as a Subset SPS (sequence parameter set) in the encoded bit stream.

4. The image processing device according to claim 1, wherein the one or more processors are further configured to convert the second resolution of the first depth image to the first resolution.

5. The image processing device according to claim 4, wherein the one or more processors are further configured to:
convert the second resolution of the first depth image to the first resolution by addition of an image to the first depth image,
wherein the second resolution of the first depth image is less than the third resolution of the color image.

6. An image processing method, comprising:
in an image processing device:
generating additional information including information to specify:
a color image of a subject and a depth image of the subject;
conversion information that indicates a difference between a first number of pixels of a second depth image and second number of pixels of a first depth image,
wherein a first resolution of the second depth image is based on a second resolution of the first depth image,
wherein the first resolution of the second depth image is same as a third resolution of the color image; and
resolution information that indicates the third resolution of the color image and the second resolution of the first depth image;
encoding, based on the additional information, the color image and the second depth image to generate an encoded bit stream,
wherein the encoded bit stream comprises the additional information as SEI (supplemental enhancement information) in the encoded bit stream; and
transmitting the encoded bit stream.

7. An image processing device, comprising:
one or more processors configured to:
receive an encoded bit stream comprising additional information as SEI (supplemental enhancement information) in the encoded bit stream,
wherein the encoded bit stream is based on a color image of a subject and a first depth image of the subject,
wherein a first resolution of the first depth image is same as a second resolution of the color image, and
wherein the additional information includes information to specify:
the color image and a second depth image of the subject,
conversion information that indicates a difference between a first number of pixels of the first depth image and a second number of pixels of the second depth image,
wherein the first resolution of the first depth image is based on a third resolution of the second depth image; and
resolution information that indicates the second resolution of the color image and the third resolution of the second depth image;
decode the encoded bit stream to generate the color image and the first depth image;
extract the second depth image with the third resolution from the generated first depth image, based on the received additional information;
generate a new color image based on the color image and the extracted second depth image.

8. The image processing device according to claim 7, wherein the encoded bit stream comprises the color image and the first depth image that are encoded based on an MVC (multiview video coding) scheme.

9. The image processing device according to claim 7, wherein the encoded bit stream comprises the color image and the first depth image that are encoded based on an MVC (multiview video coding) scheme,
wherein the additional information specifies:
the color image and the second depth image as SEI in the encoded bit stream; and
the conversion information and the resolution information as a Subset SPS (sequence parameter set) in the encoded bit stream.

10. The image processing device according to claim 7,
wherein the first resolution of the first depth image is based on conversion of the third resolution of the second depth image by addition of an image to the second depth image,
wherein the third resolution of the second depth image is lower than the second resolution of the color image.

11. An image processing method, comprising:
in an image processing device:
receiving an encoded bit stream comprising additional information as SEI (supplemental enhancement information) in the encoded bit stream,
wherein the encoded bit stream is based on a color image of a subject and a first depth image of the subject,
wherein a first resolution of the first depth image is same as a second resolution of the color image, and
wherein the additional information includes information to specify:
the color image and a second depth image of the subject,
conversion information that indicates a difference between a first number of pixels of the first depth image and a second number of pixels of the second depth image,
wherein the first resolution of the first depth image is based on a third resolution of the second depth image; and
resolution information that indicates the second resolution of the color image and the third resolution of the second depth image;
decoding the encoded bit stream to generate the color image and the first depth image;
extracting the second depth image with the third resolution from the generated first depth image, based on the received additional information; and generating a new color image based on the color image and the extracted second depth image.

12. An image processing device, comprising:
one or more processors configured to:
  receive an encoded bit stream comprising additional information as SEI (supplemental enhancement information) in the encoded bit stream,
    wherein the encoded bit stream is based on a color image of a subject and a first depth image of the subject,
    wherein a first resolution of the first depth image is same as a second resolution of the color image, and
    wherein the additional information includes information to specify:
      the color image and a second depth image of the subject,
      conversion information that indicates a difference between a first number of pixels of the first depth image and a second number of pixels of the second depth image,
    wherein the first resolution of the first depth image is based on conversion of a third resolution of the second depth image by addition of a side image to the second depth image;
  decode the encoded bit stream to generate the color image and the first depth image;
  crop the side image from the generated first depth image to restore the second depth image with the third resolution, based on the received additional information;
  generate a new color image based on the color image and the restored second depth image.

* * * * *